US012791888B2

(12) United States Patent
Reimer et al.

(10) Patent No.: US 12,791,888 B2
(45) Date of Patent: Nov. 10, 2026

(54) LOW-LOSS WAVEGUIDING STRUCTURES, IN PARTICULAR MODULATORS

(71) Applicant: HyperLight Corporation, Cambridge, MA (US)

(72) Inventors: Christian Reimer, Wellesley, MA (US); Jeffrey Cole Holzgrafe, Somerville, MA (US); Mian Zhang, Cambridge, MA (US); Kevin Luke, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 203 days.

(21) Appl. No.: 18/777,425

(22) Filed: Jul. 18, 2024

(65) Prior Publication Data

US 2025/0013086 A1 Jan. 9, 2025

Related U.S. Application Data

(63) Continuation-in-part of application No. 18/652,711, filed on May 1, 2024, now Pat. No. 12,306,482, and (Continued)

(51) Int. Cl.

| | |
|---|---|
| ***G02F 1/035*** | (2006.01) |
| ***G02B 6/122*** | (2006.01) |

(Continued)

(52) U.S. Cl.

CPC ........... *G02F 1/035* (2013.01); *G02B 6/1228* (2013.01); *G02F 1/225* (2013.01); *G02B 6/2813* (2013.01); *G02F 1/0118* (2013.01)

(58) Field of Classification Search

CPC ....... G02B 2006/12142; G02F 1/01708; G02F 1/025; G02F 1/035; G02F 1/0356;

(Continued)

(56) References Cited

U.S. PATENT DOCUMENTS

| | | | |
|---|---|---|---|
| 4,448,479 | A | 5/1984 | Alferness |
| 4,553,810 | A | 11/1985 | Alferness |

(Continued)

FOREIGN PATENT DOCUMENTS

| | | |
|---|---|---|
| CN | 109633608 | 4/2019 |
| CN | 111736403 | 2/2022 |

(Continued)

OTHER PUBLICATIONS

"Electrooptic Polymer Modulator With Single-Mode to Multimode Waveguide Transitions" by DeRose et al., IEEE Photonics Technology Letters, vol. 20, No. 12, pp. 1051-1053 (Year: 2008).*

(Continued)

*Primary Examiner* — Robert Tavlykaev

(74) *Attorney, Agent, or Firm* — Van Pelt, Yi & James LLP

(57) ABSTRACT

An optical device is described. The optical device includes a waveguide and a modulation driver. The waveguide includes a first region, a second region, and a tapered region between the first and second regions. The first region supports a first set of modes of an optical signal. The second region supports a second set of modes of the optical signal. The first set of modes is different from the second set of modes. The tapered region is between the first region and the second region. The waveguide includes lithium. The modulation driver is configured to provide modulation of the optical signal in the first region.

20 Claims, 12 Drawing Sheets

Related U.S. Application Data a continuation-in-part of application No. 18/370,370, filed on Sep. 19, 2023, now Pat. No. 12,474,603, said application No. 18/652,711 is a continuation of application No. 17/896,995, filed on Aug. 26, 2022, now Pat. No. 12,013,601, said application No. 18/370,370 is a continuation of application No. 17/532,244, filed on Nov. 22, 2021, now Pat. No. 11,815,750, which is a continuation of application No. 16/924,767, filed on Jul. 9, 2020, now Pat. No. 11,181,760, said application No. 17/896,995 is a continuation of application No. 16/838,763, filed on Apr. 2, 2020, now Pat. No. 11,474,384.

(60) Provisional application No. 62/871,928, filed on Jul. 9, 2019.

(51) Int. Cl.

| | |
|---|---|
| ***G02F 1/225*** | (2006.01) |
| *G02B 6/28* | (2006.01) |
| *G02F 1/01* | (2006.01) |

(58) Field of Classification Search
CPC .......... G02F 1/065; G02F 1/095; G02F 1/225; G02F 1/2255; G02F 1/2257; G02F 1/212
USPC .................................................... 385/1–3, 14
See application file for complete search history.

(56) References Cited

U.S. PATENT DOCUMENTS

| | | | | |
|---|---|---|---|---|
| 4,961,619 | A | 10/1990 | Hernandez-Gil | |
| 5,091,981 | A | 2/1992 | Cunningham | |
| 5,157,756 | A | 10/1992 | Nishimoto | |
| 5,799,119 | A | 8/1998 | Rolland | |
| 6,069,729 | A | 5/2000 | Gill | |
| 6,853,793 | B1 | 2/2005 | van der Vliet | |
| 6,934,446 | B2 | 8/2005 | Rasras | |
| 7,155,088 | B2 | 12/2006 | Thapliya | |
| 7,251,406 | B2 | 7/2007 | Luo | |
| 7,333,691 | B1 | 2/2008 | Gill | |
| 7,801,400 | B2 | 9/2010 | Sugiyama | |
| 8,346,025 | B2 | 1/2013 | Gill | |
| 8,600,198 | B2 * | 12/2013 | Sudo | G02F 1/2257 438/31 |
| 9,036,954 | B2 | 5/2015 | Kobrinsky | |
| 9,460,740 | B1 | 10/2016 | Staffaroni | |
| 9,465,163 | B2 | 10/2016 | Kumar | |
| 9,759,982 | B2 | 9/2017 | Feng | |
| 9,778,417 | B2 | 10/2017 | Cherchi | |
| 9,817,186 | B2 | 11/2017 | Kamei | |
| 9,939,709 | B2 | 4/2018 | Iwatsuka | |
| 10,241,273 | B2 | 3/2019 | Tu | |
| 10,317,770 | B2 | 6/2019 | Kono | |
| 11,181,760 | B2 | 11/2021 | Zhang | |
| 11,815,750 | B2 | 11/2023 | Zhang | |
| 2003/0068152 | A1 | 4/2003 | Lawrence, III | |
| 2004/0037497 | A1 | 2/2004 | Lee | |
| 2004/0151423 | A1 | 8/2004 | Izhaky | |
| 2006/0210212 | A1 | 9/2006 | Sugiyama | |
| 2009/0142019 | A1 | 6/2009 | Popovic | |
| 2011/0081107 | A1 | 4/2011 | Sugiyama | |
| 2011/0262071 | A1 | 10/2011 | Mitomi | |
| 2011/0317956 | A1 | 12/2011 | Sudo | |
| 2012/0027337 | A1 | 2/2012 | Kondou | |
| 2015/0260916 | A1 | 9/2015 | Cherchi | |
| 2015/0293384 | A1 * | 10/2015 | Ogawa | G02F 1/2257 385/11 |
| 2015/0293427 | A1 | 10/2015 | Goi | |
| 2016/0327751 | A1 | 11/2016 | Wu | |
| 2017/0351025 | A1 | 12/2017 | Trita | |
| 2018/0211685 | A1 | 7/2018 | Mehfuz | |
| 2019/0361315 | A1 | 11/2019 | Zhou | |
| 2020/0088942 | A1 | 3/2020 | Bian | |
| 2020/0359116 | A1 | 11/2020 | Mehrvar | |
| 2021/0080796 | A1 | 3/2021 | Kissa | |
| 2021/0278597 | A1 | 9/2021 | Sugiyama | |
| 2021/0325607 | A1 | 10/2021 | Oka | |
| 2023/0375781 | A1 | 11/2023 | Take | |

FOREIGN PATENT DOCUMENTS

| | | |
|---|---|---|
| JP | 6476876 | 3/2019 |
| WO | 2018031916 | 2/2018 |

OTHER PUBLICATIONS

"A Process-Tolerant Ring Modulator Based on Multi-Mode Waveguides" by Luo et al., IEEE Photonics Technology Letters, vol. 28, No. 13, pp. 1391-1394 (Year: 2016).*

Bristow et al., "Depolarization of Single Mode Channel Waveguides on Lithium Niobate", SPIE 0835, pp. 233-237 (Year: 1987).

Chen et al., Broadband Adiabatic Polarization Rotator-Splitter Based on a Lithium Niobate on Insulator Platform, Photonics Research, vol. 9, No. 12 / Dec. 2021, pp. 2319-2324.

Extended European Search Report for Application 20836102.2, dated Jun. 21, 2023 (Year: 2023).

Ma et al., "Ultralow loss single layer submicron silicon waveguide crossing for SOI optical interconnect." Optics Express, vol. 21, No. 24, pp. 29374-29382, Year 2013.

Sanchis et al., "Highly efficient crossing structure for silicon-on-insulator waveguides" Optics Letters/ vol. 34, No. 18, pp. 2760-2762 (Year: 2009).

Search Report from corresponding International Application No. PCT/US2020/070252, mailed Oct. 22, 2020.

Wang et al., Efficient Polarization Splitter-Rotator on Thin-Film Lithium Niobate, Optics Express, vol. 29, No. 23 / Nov. 8, 2021, pp. 38044-38052.

* cited by examiner

LOW-LOSS WAVEGUIDING STRUCTURES, IN PARTICULAR MODULATORS

CROSS REFERENCE TO OTHER APPLICATIONS

This application is a continuation in part of U.S. patent application Ser. No. 18/370,370 entitled LOW-LOSS WAVEGUIDING STRUCTURES, IN PARTICULAR MODULATORS filed Sep. 19, 2023, which is a continuation of U.S. patent application Ser. No. 17/532,244, now U.S. Pat. No. 11,815,750, entitled LOW-LOSS WAVEGUIDING STRUCTURES, IN PARTICULAR MODULATORS filed Nov. 22, 2021, which is a continuation U.S. patent application Ser. No. 16/924,767, now U.S. Pat. No. 11,181,760, entitled LOW-LOSS WAVEGUIDING STRUCTURES, IN PARTICULAR MODULATORS filed Jul. 9, 2020, which claims priority to U.S. Provisional Patent Application No. 62/871,928 entitled LOW-LOSS WAVEGUIDING STRUCTURES, IN PARTICULAR MODULATORS filed Jul. 9, 2019, all of which are incorporated herein by reference for all purposes.

This application is a continuation in part of U.S. patent application Ser. No. 18/652,711 entitled VELOCITY MATCHED ELECTRO-OPTIC DEVICES filed May 1, 2024, which is a continuation of U.S. patent application Ser. No. 17/896,995, now U.S. Pat. No. 12,013,601, entitled VELOCITY MATCHED ELECTRO-OPTIC DEVICES filed Aug. 26, 2022, which is a continuation of U.S. patent application Ser. No. 16/838,763, now U.S. Pat. No. 11,474, 384, entitled VELOCITY MATCHED ELECTRO-OPTIC DEVICES filed Apr. 2, 2020, all of which are incorporated herein by reference for all purposes.

BACKGROUND OF THE INVENTION

Conventional integrated modulators have an active section, i.e. a portion with electrodes, that have dominant loss from absorption. Existing lithium niobate modulators based on electro-optic effect do not utilize high confinement optical modes.

An object of the present disclosure is to overcome the shortcomings of the prior art by providing a hybrid optical modulator that utilizes both narrow, e.g. single mode, and wider, e.g. multimode, optical waveguides.

BRIEF DESCRIPTION OF THE DRAWINGS

Various embodiments of the invention are disclosed in the following detailed description and the accompanying drawings.

DETAILED DESCRIPTION

Figure 1A:
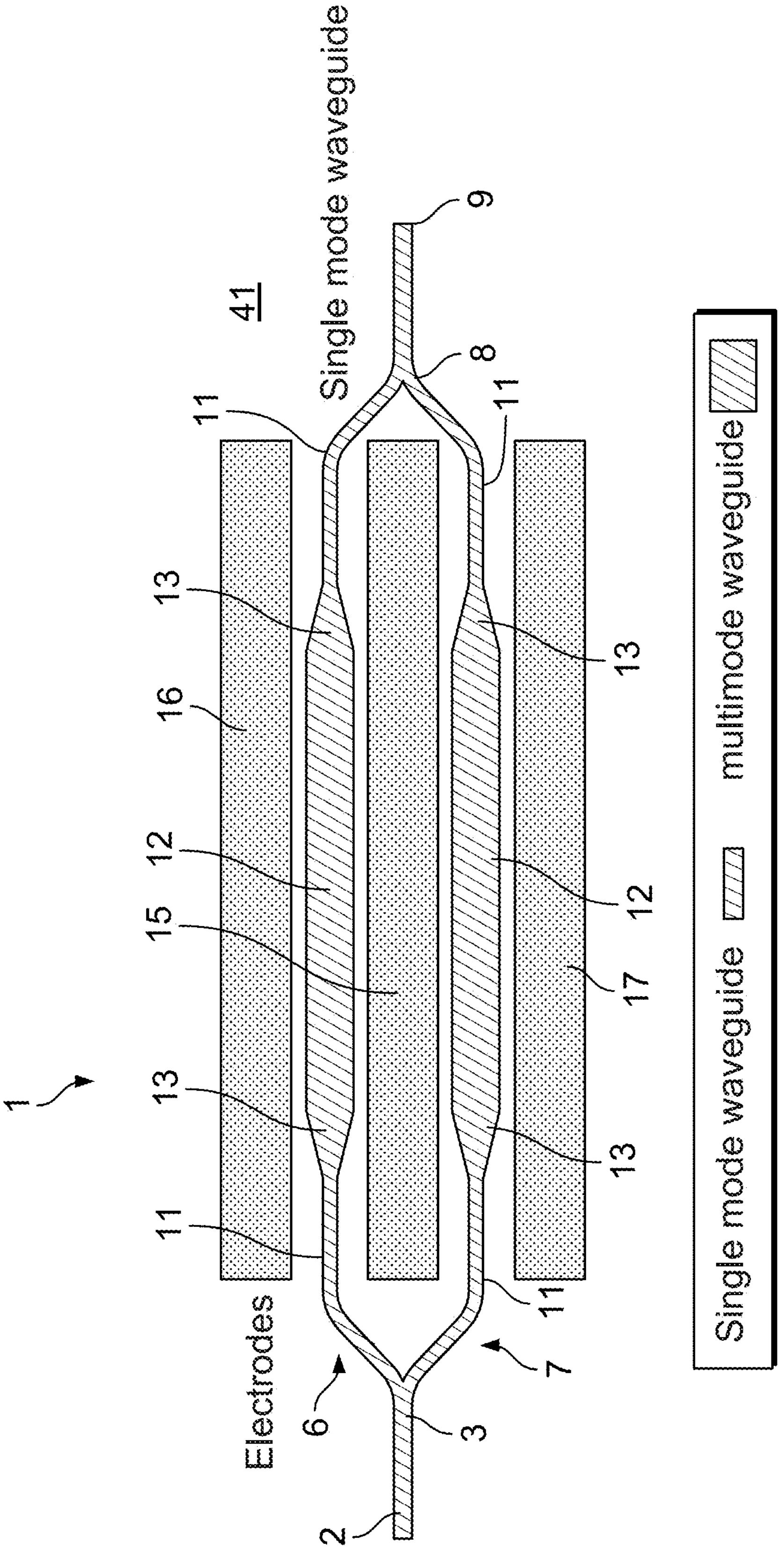
FIG. 1A is a schematic of an electro-optic modulator with tapered waveguide section to reduce optical loss.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An optical device including a waveguide including lithium and a modulation driver is described. The waveguide includes a first region, a second region, and a tapered region between the first and second regions. The first region supports a first set of modes of an optical signal. The second region supports a second set of modes of the optical signal. The first set of modes is different from the second set of modes. The tapered region is between the first region and the second region. The modulation driver is configured to provide modulation of the optical signal in the first region. The tapered region may be a low loss tapered region, such as an adiabatic tapered region. The first and/or the second region may include waveguide bend(s).

In some embodiments, the modulation driver includes at least one of a heater or an electrode proximate to the first region of the waveguide. In some embodiments, the modulation driver includes electrodes. The first region and at least a portion of the tapered region of the waveguide are between the electrodes. In some embodiments, the modulation driver includes electrodes. At least the first region is between the electrodes. The electrodes include electrode tapered region(s). At least one of the second region and the tapered region are proximate to the electrode tapered region such that a distance between the waveguide and the plurality of electrodes varies.

In some embodiments, the waveguide includes a first waveguide arm and a second waveguide arm. Each of the first and second waveguide arms are in the first region, the tapered region, and the second region. The first and second waveguide arms each support the first set of modes in the first region. The first and second waveguide arms also each support the second set of modes in the second region. The first waveguide arm and the second waveguide arm cross in the second region. In some embodiments, the crossing of the first and second waveguide arms has a loss not exceeding 0.2 dB and a cross-talk of light scattered into the crossing arm not exceeding negative 50 dB. In some embodiments, the loss does not exceed 0.1 dB. In some such embodiments, the loss does not exceed 0.05 dB. In some embodiments, the cross-talk of light scattered into the crossing does not exceed negative 40 dB. In some embodiments, the cross-talk of light scattered into the crossing does not exceed negative 30 dB. Cross-talk of light scattered is light from one arm at the crossing going into the other arm. In some embodiments, the first and second waveguide arms bend in the second region.

In some embodiments, the waveguide includes a first waveguide arm and a second waveguide arm. The first waveguide arm and the second waveguide arms are each included in the first region and the tapered region. The first and second waveguide arms each support the first set of modes in the first region. The waveguide further includes a splitter in the second region configured to combine the optical signal for first waveguide arm and the second waveguide arm into a single arm. In some such embodiments, the waveguide includes a third region and a fourth region. The single waveguide arm supports a third set of modes in the third region and a fourth set of modes in the fourth region, the third set of modes and the fourth set of modes are different from the second set of modes. The optical signal is modulated in the third region and/or the fourth region. In some such embodiments, the optical device is configured as a frequency comb.

In some embodiments, the first region has a cross sectional area greater than 0.1 $\mu m^2$ and less than 10 $\mu m^2$. In some embodiments, the first region has a cross sectional area of at least 0.2 $\mu m^2$ and not more than 7 $\mu m^2$. In some such embodiments, the first region has the cross sectional area of less than 3 $\mu m^2$.

An optical device including a waveguide including lithium and modulation driver(s) is described. The waveguide includes a plurality of regions. The regions support a plurality of sets of modes of an optical signal. A first portion of the sets of modes is different from a second portion of the sets of modes. Tapered regions are between the regions. The modulation driver(s) are configured to provide modulation of the optical signal in at least a portion of the regions. The optical device includes at least one of a heater as part of the at least one modulation driver, a first waveguide arm and a second waveguide arm as part of the waveguide, or a configuration of the regions and the tapers as a frequency comb. The first and second waveguide arm are included in a third portion of the regions and at least a portion of the plurality of tapered regions. The first waveguide arm and the second waveguide arm cross in the second portion of the regions. The crossing has a loss not exceeding 0.1 dB and a cross-talk of light scattered into the crossing arm not exceeding negative 30 dB. Other loss and cross-talk ranges are possible.

A method is also described. The method includes inputting an optical signal to a waveguide that includes lithium. The waveguide also includes a first region supporting a first set of modes of an optical signal, a second region supporting a second set of modes of the optical signal, and a tapered region between the first region and the second region. The first set of modes is different from the second set of modes. The method also includes modulating the optical signal using modulation driver. The modulation driver is configured to provide modulation of the optical signal in the first region and is proximate to the first region.

In some embodiments, modulating the optical signal includes heating the first region and/or exposing the first region to an electric field. In some embodiments, the modulation driver includes electrodes. The first region and at least a portion of the tapered region are between the plurality of electrodes.

In some embodiments, the waveguide includes a first waveguide arm and a second waveguide arm. Each of the first and second waveguide arms is included in the first region, the tapered region, and the second region. The first and second waveguide arm each support the first set of modes in the first region and the second set of modes in the second region. The first waveguide arm and the second waveguide arm cross in the second region. The crossing of the first waveguide arm and the second waveguide arm has a loss not exceeding 0.1 dB and a cross-talk of light scattered into the crossing arm not exceeding negative 30 dB. In some embodiments, the first waveguide arm and the second waveguide arm include a bend in the second region. In some embodiments, the modulation driver includes electrodes. At least the first region is between the electrodes. The electrodes include an electrode tapered region. At least one of the second region and the tapered region are proximate to the electrode tapered region such that a distance between the waveguide and the electrodes varies.

In some embodiments, the waveguide includes a first waveguide arm and a second waveguide arm. The first waveguide arm and the second waveguide arm are each included in the first region and the tapered region. The first waveguide arm and the second waveguide arm each support the first set of modes in the first region. The waveguide further includes a splitter in the second region configured to combine the optical signal for first waveguide arm and the second waveguide arm into a single arm. The waveguide and modulation driver may be configured as a frequency comb.

Figure 1B:
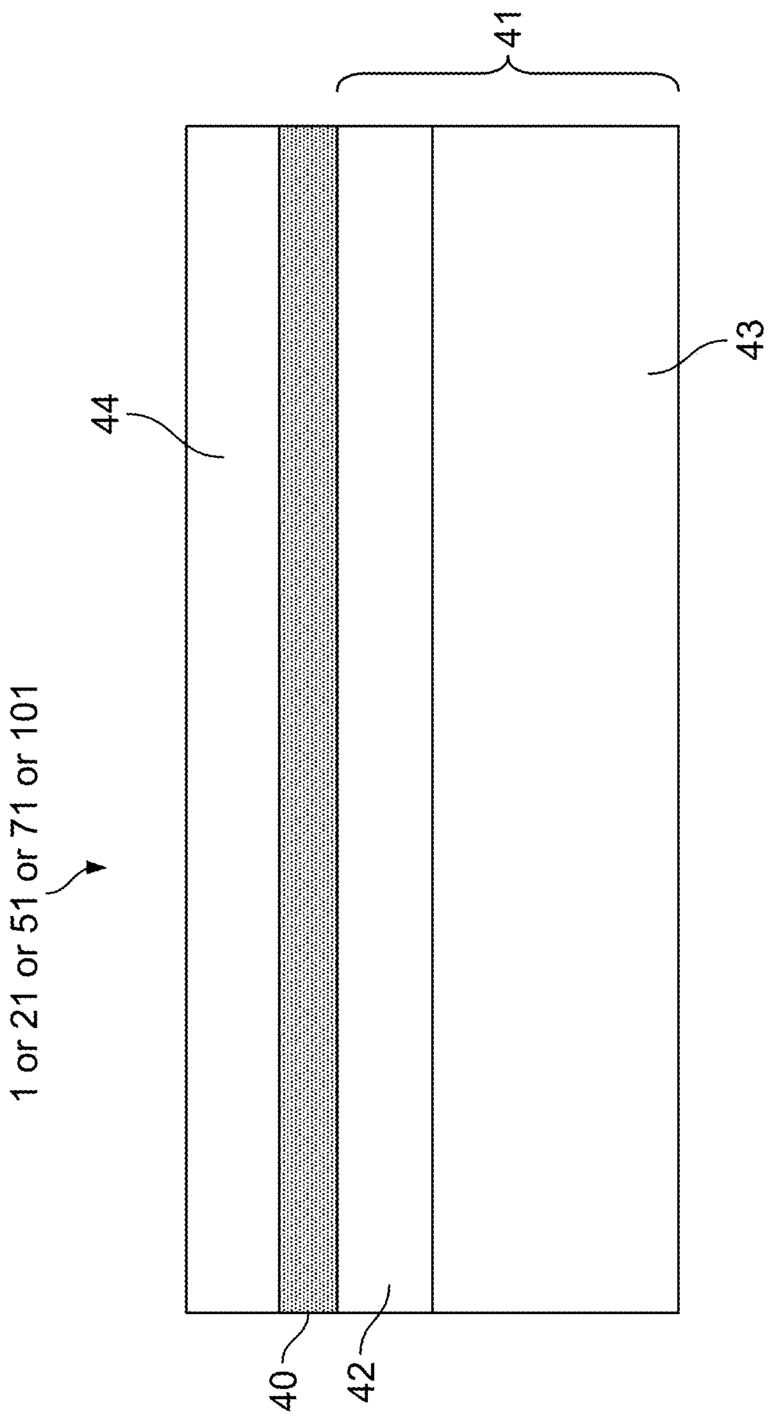
FIG. 1B is a cross-sectional view of the electro-optic modulator of FIG. 1A.

With reference to FIGS. 1A and 1B, an electro-optic intensity modulator 1, includes an input waveguide or port 2 optically coupled to a first coupler 3, e.g. a Y-splitter or 2×2 coupler, for splitting an input optical signal into first and second sub-beams, which propagate along first and second arms 6 and 7, and a second coupler 8, e.g. a Y-splitter, for recombining, e.g. interfering, the first and second sub-beams for output an output waveguide or port 9. Each of the first and second arms 6 and 7 may comprise both narrower, e.g. single mode, waveguide sections 11, e.g. 400 nm to 1000 nm wide, and/or 200 nm to 1500 nm thick, and/or with a cross sectional area <3 $\mu m^2$, preferably less than 1 $\mu m^2$, and wider, e.g. multimode, waveguide sections 12, e.g. 1000 nm to 4000 nm wide, and/or 200 nm to 1500 nm thick, and/or a cross sectional area of preferably >0.2 $\mu m^2$ and/or <10 $\mu m^2$. Ideally, the narrower waveguide sections 11 may only support one TE mode and one TM mode, e.g. with optical propagation loss <0.6 dB/cm for fundamental $TE_o$ and $TM_o$ modes, and e.g. with optical propagation loss >1 dB/cm for higher order TE and TM modes. The wider waveguide sections 12 support more than one TE mode and more than one TM mode with optical propagation loss <0.6 dB/cm for all modes; however, ideally only the fundamental TM and TE modes are excited. The wider waveguide sections 12 reduce optical propagation loss from scattering from waveguide surfaces, and absorption loss from waveguide surfaces and surrounding cladding materials, when compared to the narrower waveguide sections 11. Accordingly, the narrower, e.g. single mode, waveguide sections 11 may filter out higher order modes than the fundamental $TE_o$ and $TM_o$ modes.

The narrower waveguide sections 11 may include non-trivial guiding structures, such as splitters, e.g. the first and second couplers 3 and 8, bends, and multimode interferometers (MMI). The wider waveguide sections 12 may be significantly longer than the narrower waveguide sections 11, e.g. commonly by a factor of 10 to 100, Figure not to scale. The wider waveguide sections 12 may include simple structures, e.g. a straight line and potentially shallow bends. The wider waveguide sections 12 and the narrower waveguide sections 11 may be connected with tapers 13, which may be designed such that only the fundamental mode of the wider waveguide section 12 is excited. Particular examples of such tapers would include linear tapering of the waveguide width, cubic tapering of the waveguide width or exponential tapering, as well as other nonlinear tapering methods. The tapering may be configured to be gradual enough to enable modes to be adiabatically converted from the single mode to the fundamental TE or TM mode of the wider waveguide section 12 without excessive tapering loss or excitation of optical modes other than the fundamental TE and TM mode.

The illustrated modulator 1 may comprise an X- or Y-cut Lithium Niobate ($LiNbO_3$ or LN) design including a central signal electrode 15 with outer ground electrodes 16 and 17 adjacent the outer edges of the first and second arms 6 and 7, respectively. Ideally, the central signal electrode 15 and the outer ground electrodes 16 and 17 extend along and/or adjacent to, e.g. beside, at least a portion of wider waveguide sections 12 in the first and second arms 6 and 7. Preferably, the central signal electrode 15 and the outer ground electrodes 16 and 17 extend longer than the wider waveguide sections 12 and adjacent to narrower waveguide sections 11 in the first and second arms 6 and 7. However, a Z-cut LN design with the signal electrode 15 and one of the ground electrodes 16 over top of the first and second arms 6 and 7, respectively, or any other waveguide material, e.g. silicon, and electrode control for transmitting an electronic modulation signal to the first and second sub-beams of the input optical signal is within the scope of the invention. The above structure may also be utilized with the signal and ground electrodes 15 and 16 on a single one of the first and second arms 6 or 7, as in a phase modulator. Preferably, the waveguides comprising the input waveguide or port 2, the first coupler 3, the first and second arms 6 and 7, the second coupler 8, and the output waveguide or port 9 comprise thin film lithium niobate or lithium tantalate, which may be fabricated in accordance with the methods disclosed in WO 2018/031916 filed Aug. 11, 2017 by Wang et al., which is incorporated herein by reference.

With reference to FIG. 1B, ideally, the waveguide cores, e.g. comprising the input waveguide or port 2, the first coupler 3, the first and second arms 6 and 7, the second coupler 8, and the output waveguide or port 9, of the modulator 1 and any of the modulators described herein after may be formed in an optical device layer 40 on a substrate 41, including a lower cladding layer 42 and a handle layer 43. In a preferred embodiment, the first and second arms 6 and 7 may comprise single crystal Lithium Niobate ($LiNbO_3$ or LN) or Lithium Tantalate ($LiTaO_3$ or LT), and the substrate 41 may comprise a Lithium Niobate on insulator (LNOI) structure (or Lithium Tantalate on insulator structure (LTOI)), including a silicon dioxide ($SiO_2$) lower cladding layer 42 on a silicon (Si) handle layer 43. However, other suitable waveguide materials exhibiting anisotropy in their dielectric properties, e.g. an electro-optic material with an electro-optic constant >10 pm/V, such as gallium arsenide (GaAs), indium phosphide (InP) and barium titanate (BTO, $BaTiO_3$), are also within the scope of the invention. Note that the handle layer 43 may be other materials, such as quartz, sapphire, fused silica. The lower cladding layer 42 may be any planarized material that has a lower refractive index than the waveguide, e.g. LN or LT, material, including air (suspended structures). An upper cladding layer 44 with a lower refractive index than the waveguide, e.g. LN or LT, material, e.g. an upper $SiO_2$, may also be provided covering the modulator structure, i.e. first and second arms 6 and 7, and the first and second couplers 3 and 8.

Figure 2:
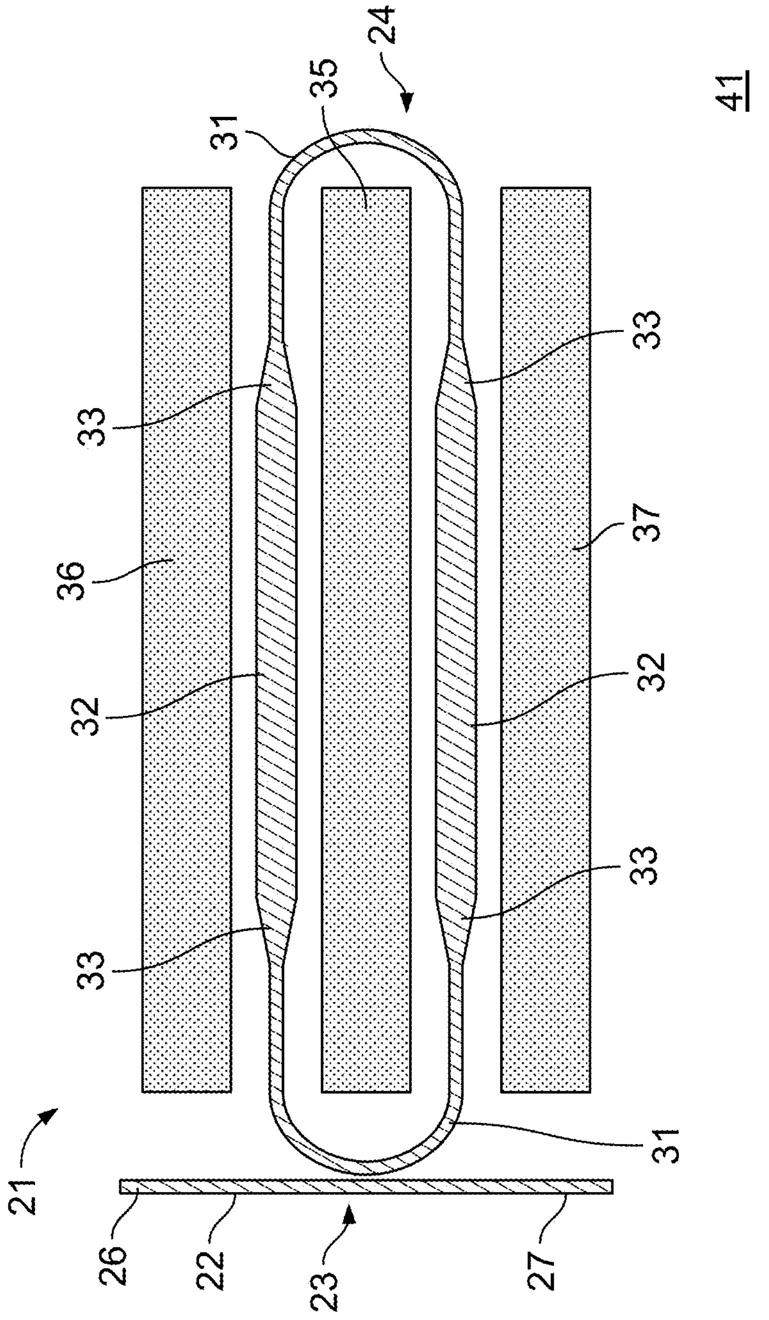
FIG. 2 is a schematic of a resonator with tapered transition to low-loss waveguide sections.

With reference to FIG. 2, the above described innovation of using adiabatic tapers to excite the low-loss fundamental mode in multimode optical waveguides is applicable to multiple different devices and geometries, where optical propagation loss is an important factor. In particular, a ring resonator 21, e.g. an elongated racetrack or loop resonator, comprising a bus waveguide 22, a coupler 23, and a ring or loop waveguide 24. The bus waveguide 22 includes an input port or waveguide 26 and an output port or waveguide 27 on opposite ends thereof with the coupler 23 therebetween. The coupler 23 may comprise an optical coupler, e.g. 2×2 optical coupler, for passing a first portion of the input light from the bus waveguide 22 into the ring waveguide 24 and a second portion of the input light to the output port or waveguide 27, and for passing a first portion of the light inside the ring waveguide 24 out to the bus waveguide 22 for interference with the second portion of the input light and for output the output port or waveguide 27, e.g. for use as a filter or modulator for outputting a modulated output beam of light. An additional bus waveguide may be provided at the opposite side of the ring waveguide 24 providing an additional output or drop port, if required, e.g. for monitoring.

The ring waveguide 24 may include long substantially straight or less curved sections, at least some of which comprise wider, e.g. multimode, waveguide sections 32 for low loss, and bend or curved sections, at least some of which comprise narrower, e.g. single mode, waveguide sections 31 to avoid mode coupling in the bends. The narrower waveguide sections 31 may include waveguide sections proximate the coupler 23 and waveguide sections on the far side of the ring waveguide 24 including the U-shaped bend between two elongated wider waveguide sections 32. The wider waveguide sections 32 and the narrower waveguide sections 31 are connected with tapers 33, as hereinbefore described with reference to tapers 13, which may be designed such that only the fundamental mode, e.g. $TE_0$ and $TM_0$, of the wider waveguide section 32 is excited. Each of the bus waveguide 22, the coupler 23 and the ring waveguide 24 may comprise both narrower, e.g. single mode, waveguide sections 31, e.g. 400 nm to 1000 nm wide, and/or 200 nm to 1500 nm thick, and/or with a cross sectional area <3 μm$^2$, preferably less than 1 μm$^2$, and wider waveguide sections 32, e.g. 1000 nm to 4000 nm wide, and/or 200 nm to 1500 nm thick, and a cross sectional area of preferably >0.3 μm$^2$ and/or <10 μm$^2$. Ideally, the narrower waveguide sections 31 may only support and maintain one fundamental $TE_0$ mode and one $TM_0$ mode with optical propagation loss <0.6 dB/cm, and with optical propagation loss >1 dB/cm for higher modes. The wider waveguide sections 32 may support more than one TE mode and more than one TM mode with optical propagation loss <0.6 dB/cm for all modes; however, ideally only the fundamental $TM_0$ and $TE_0$ modes are excited. The wider waveguide sections 32 reduce optical propagation loss from scattering from waveguide surfaces, and absorption loss from waveguide surfaces and surrounding cladding materials, when compared to the narrower waveguide sections 31. The narrower, e.g. single mode, waveguide sections 31 filter out higher order mode resonances.

Particular examples of the tapers 33 would include linear tapering of the waveguide width, cubic tapering of the waveguide width or exponential tapering of the waveguide width, as well as other nonlinear tapering methods. The tapering may be configured to be gradual enough to enable modes to be adiabatically converted from the single mode to the fundamental TE or TM mode of the multimode waveguide sections 32 without excessive tapering loss or excitation of optical modes other than the fundamental TE and TM modes.

The illustrated ring resonator 21 may comprise an X- or Y-cut LN design including a central signal electrode 35 with outer ground electrodes 36 and 37 adjacent the outer edges of the wider waveguide sections 32. Ideally, the central signal electrode 35 and the outer ground electrodes 36 and 37 extend along and/or adjacent to, e.g. beside, at least a portion of the first and second wider waveguide sections 32 in the ring waveguide 24. Preferably, the central signal electrode 15 and the outer ground electrodes 16 and 17 extend longer than the first and second wider waveguide sections 32 and adjacent to narrower waveguide sections 31 in the ring waveguide 24. However, a Z-cut design with the signal electrode 35 and one of the ground electrodes 36 over top of one of the wider waveguide sections 32, or any other waveguide material, e.g. silicon, and electrode structure and control for transmitting an electronic modulation signal to the optical signal is within the scope of the invention. Preferably, the waveguides comprising the bus waveguide 22, the coupler 23, the ring waveguide 24 comprise thin film lithium niobate or lithium tantalite, which may be fabricated in accordance with the methods disclosed in WO 2018/031916 filed Aug. 11, 2017 by Wang et al., which is incorporated herein by reference.

Ideally, the waveguide cores comprising the bus waveguide 22, the coupler 23, the ring waveguide 24 of the ring resonator 21 may be formed in the optical device layer 40 on a substrate 41, from FIG. 1A, including the lower cladding layer 42 and a handle layer 43. In a preferred embodiment, the bus waveguide 22, the coupler 23 and the ring waveguide 24 are comprise single crystal Lithium Niobate ($LiNbO_3$ or LN), and the substrate 41 comprise a Lithium Niobate on insulator (LNOI) or Lithium Tantalate on insulator (LTOI) structure, including a lower cladding layer 42, e.g. a dielectric or oxide layer such as silicon dioxide ($SiO_2$), on the handle layer 43, e.g. a semiconductor like silicon (Si) or other suitable material. However, other suitable waveguide materials exhibiting anisotropy in their dielectric properties, e.g. an electro-optic material with an electro-optic constant >10 pm/V, such as gallium arsenide (GaAs), indium phosphide (InP) and barium titanate (BTO, $BaTiO_3$), are also within the scope of the invention. Note that the handle layer 43 may be other materials such as quartz, sapphire, fused silica. The lower cladding layer 42 may be any planarized material that has a lower refractive index than LN, including air (suspended structures). An upper cladding layer 44, with lower refractive index than LN, e.g. an upper dielectric or oxide layer such as $SiO_2$, may also be provided covering the modulator structure, i.e. the bus waveguide 22, the coupler 23, and the ring waveguide 24.

Figure 3A:
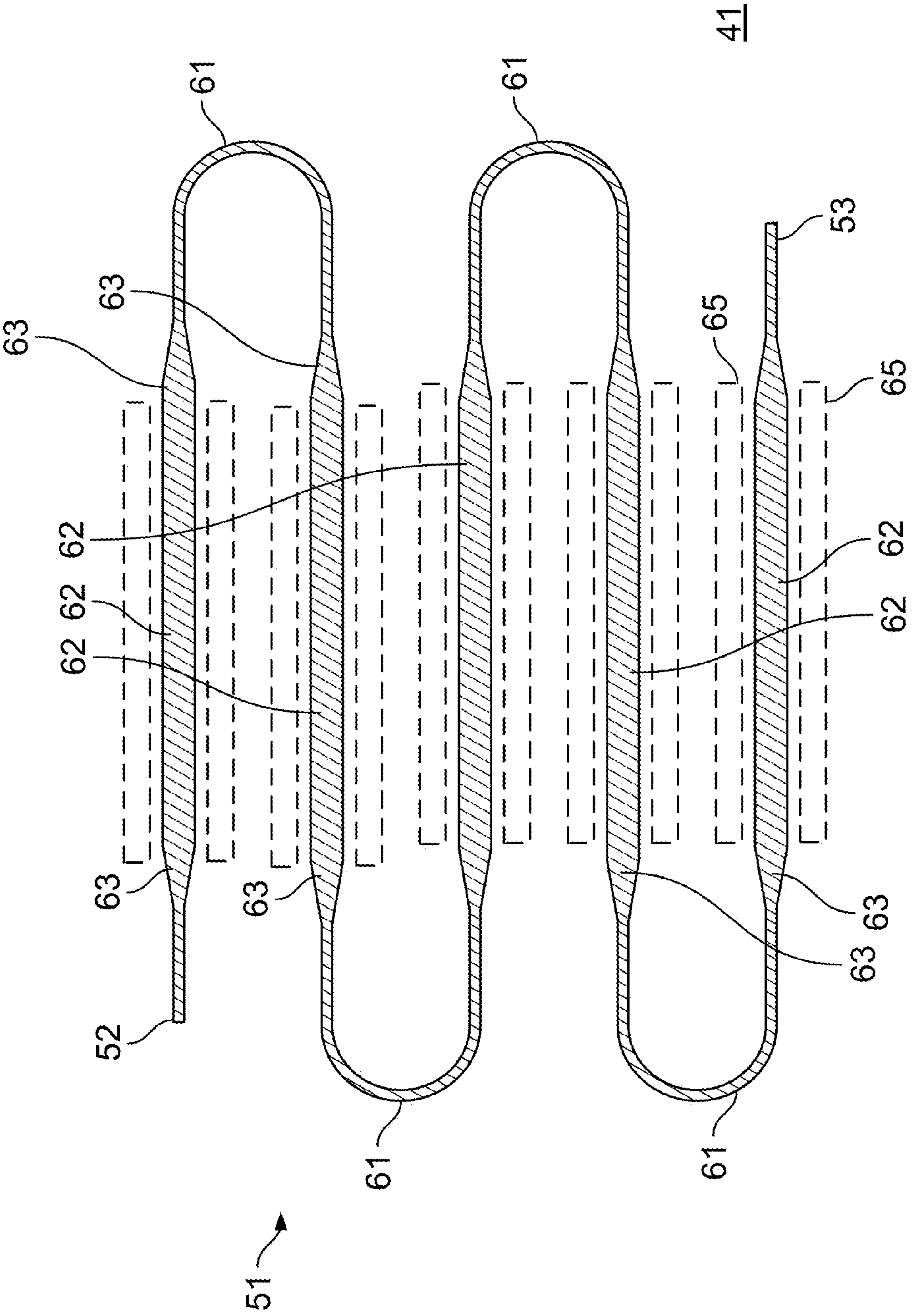
FIGS. 3A and 3B are schematics of an optical delay line, comprising bends formed by narrower, single-mode waveguides, and long straight sections formed by low-loss wider multimode waveguides.
Figure 3B:
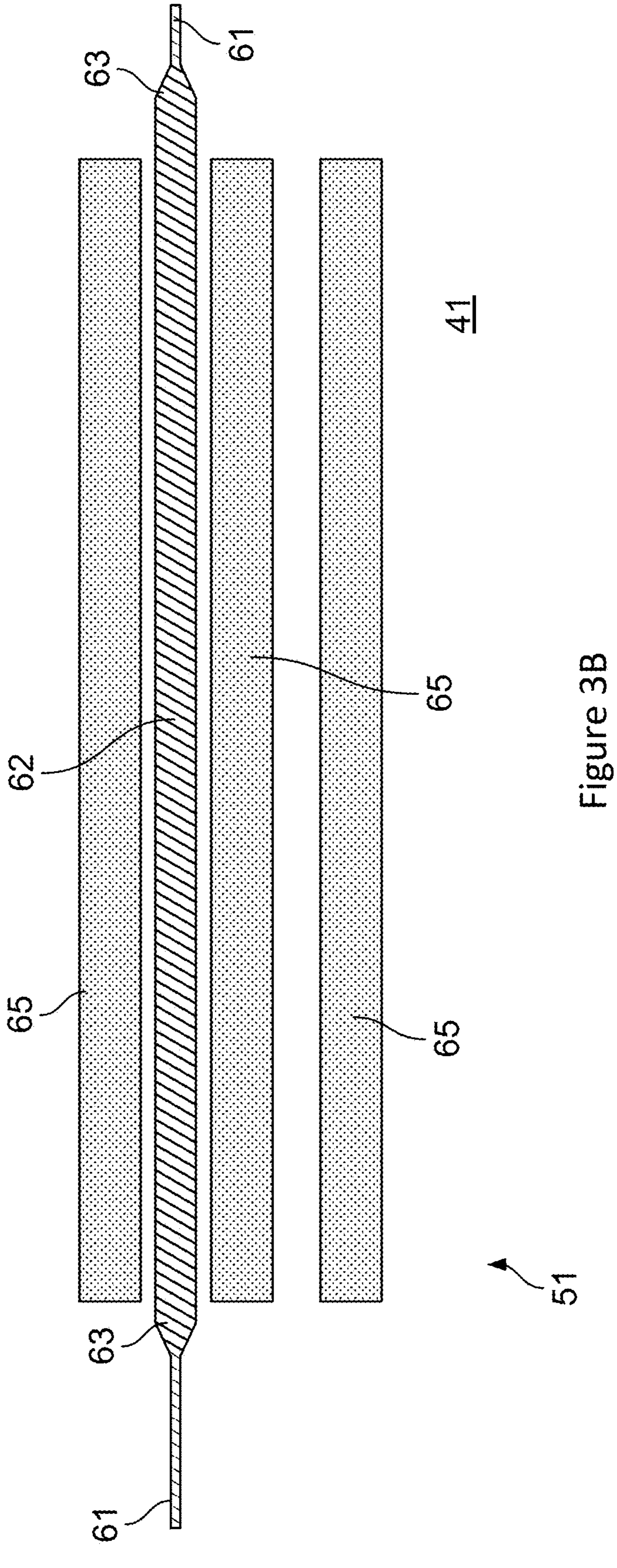

With reference to FIGS. 3A and 3B, another broader application includes an integrated optical delay line structure 51 comprising an input port 52, an output port 53, a plurality of bent sections comprising narrower, e.g. single mode, waveguide sections 61 to avoid mode coupling in the bends, and a plurality of long straight sections comprising wider, e.g. multimode, waveguide sections 62 for low loss. To minimize size, at least one and ideally all of the straight wider waveguide sections 62 are disposed parallel to each other in an array, with the bent narrower, e.g. single mode, waveguide sections 61, e.g. one or more curved sections with about a resulting 180° bend, extending between each wider straight waveguide section 62. As above, the wider waveguide sections 62 and the narrower sections 61 are connected with inverse tapers 63, as described hereinbefore with reference to tapers 13 and 33, which may be designed and configured such that only the fundamental mode of each of the wider waveguide section 62 is excited. Particular examples of such tapers 63 would include linear tapering of the waveguide width, cubic tapering of the waveguide width or exponential tapering, as well as other nonlinear tapering methods. The tapering may be configured to be gradual enough to enable modes to be adiabatically converted from the narrower sections 61 to the fundamental TE or TM mode of the wider waveguide section 62 without excessive tapering loss.

The optical delay line structure 51 may be incorporated into any optical component, e.g. phase modulator/tuner, interferometer, intensity modulator etc., and be fabricated on any waveguide structure, as hereinbefore discussed. Electrodes 65, e.g. ground and RF signal or bias, e.g. thermal, (phantom outline in FIG. 3A) may be provided adjacent to one or more of the wide waveguide sections 62 for phase modulating or biasing light propagating along the integrated optical delay line structure 51 in accordance with a phase modulating RF signal from an RF source or a bias signal from a controller. Ideally, the electrodes 65, e.g. hot and ground, extend along and/or adjacent to, e.g. beside, at least a portion of the wider waveguide sections 62. Preferably, the electrodes 65 extend longer than the wider waveguide sections 62 and adjacent to narrower waveguide sections 61.

The electrodes 65 in each set may extend parallel to each other, and each set of electrodes 65 may extend parallel to each of the other sets, and the wider waveguide sections 62 to provide a compact arrangement. The phase modulators may be driven by a common RF source, which may be split N ways where N is the number of phase modulators employed. The direction of the microwave driving field, may be the same direction as light propagation. Preferably, the waveguides comprising the optical delay line structure 51 comprise thin film lithium niobate or lithium tantalate, which may be fabricated in accordance with the methods disclosed in WO 2018/031916 filed Aug. 11, 2017 by Wang et al. The optical delay line structure 51 may comprise both the narrower waveguide sections 61, e.g. 400 nm to 1000 nm wide, and/or 200 nm to 1500 nm thick, and/or with a cross sectional area <3 μm$^2$, preferably less than 1 μm$^2$, and the wider waveguide sections 62, e.g. 1000 nm to 4000 nm wide, and/or 200 nm to 1500 nm thick, and/or a cross sectional area of preferably >0.3 $\mu m^2$ and <10 $\mu m^2$. Ideally, the narrower waveguide sections 61 may only support one TE mode and one TM mode, e.g. with optical propagation loss <0.6 dB/cm for fundamental $TE_o$ and $TM_o$ modes, and with optical propagation loss >1 dB/cm for higher TE and TM modes. The wider waveguide sections 62 may support more than one TE mode and more than one TM mode with optical propagation loss <0.6 dB/cm for all modes; however, ideally only the fundamental modes are excited.

Figure 4:
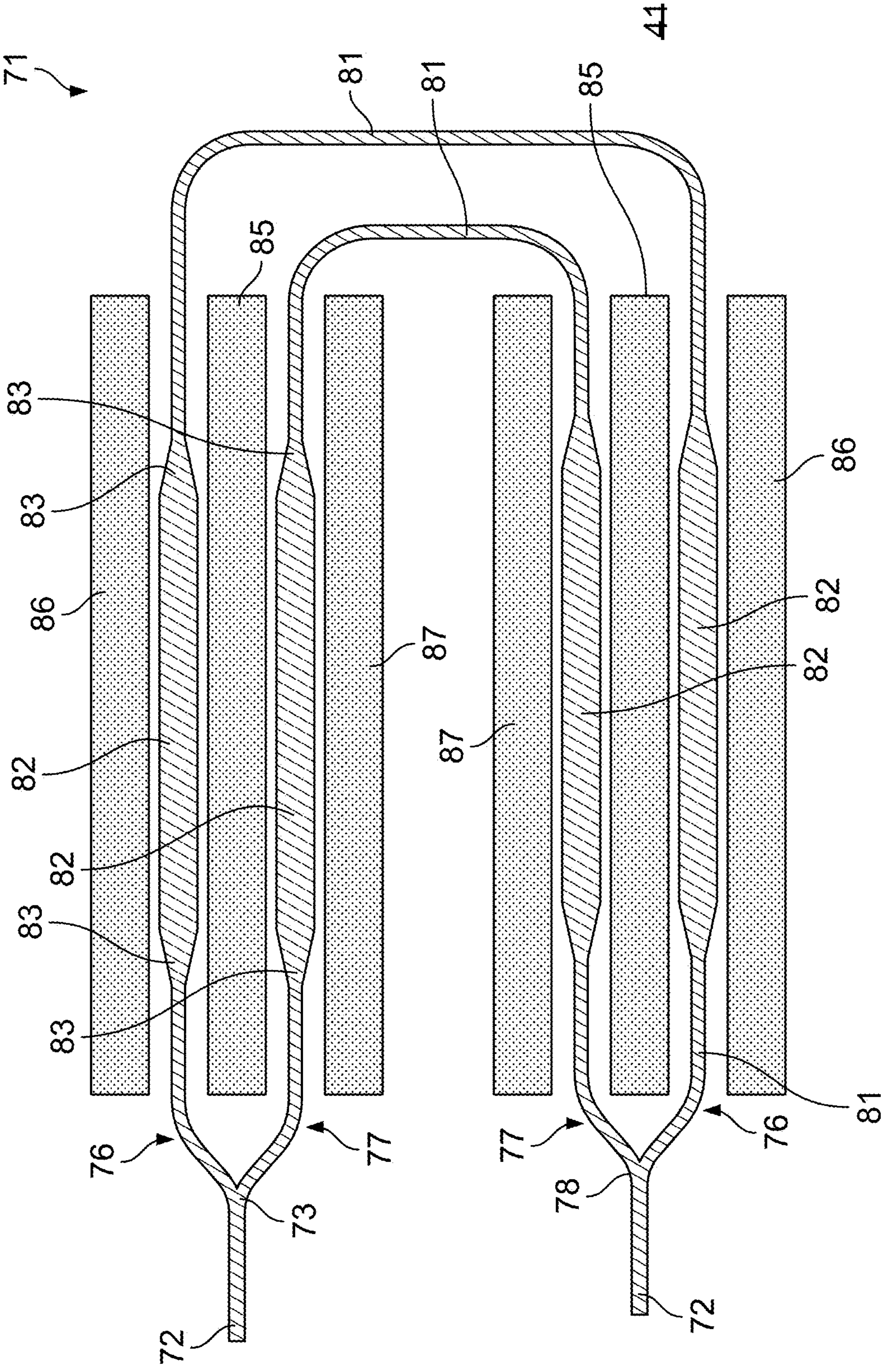
FIG. 4 is a schematic of a folded intensity modulator, where the bends are achieved with narrower, single-mode waveguides, and the straight sections employ low-loss wider multimode waveguides.

With reference to FIG. 4, an electro-optic intensity modulator 71, includes an input waveguide or port 72 optically coupled to a first coupler 73, e.g. a Y-splitter or 2×2 coupler, for splitting an input optical signal into first and second sub-beams, which propagate along first and second arms 76 and 77, and a second coupler 78, e.g. a Y-splitter, for recombining, e.g. interfering, the first and second sub-beams for output an output waveguide or port 79. Each of the first and second arms 76 and 77 comprise both narrower, e.g. single mode, waveguide sections 81 and wider, e.g. multimode, waveguide sections 82. The narrower waveguide sections 81 may include non-trivial guiding structures, such as splitters, e.g. the first and second couplers 73 and 78, and bends. The wider waveguide sections 82 may be significantly longer than the narrower waveguide sections 81, e.g. commonly by a factor of 10 to 100, Figure not to scale. The wider waveguide sections 82 may include only simple structures, e.g. a straight line and potentially shallow bends. The wider waveguide sections 82 and the narrower waveguide sections 81 are connected with inverse tapers 83, which may be configured such that only the fundamental mode of the wider waveguide sections 82 is excited, as defined hereinbefore with reference to tapers 13, 33 and 63. Particular examples of such tapers 83 would include linear tapering of the waveguide width, cubic tapering of the waveguide width or exponential tapering, as well as other nonlinear tapering methods. The tapering may be configured to be gradual enough to enable modes to be adiabatically converted from the single mode in the narrower waveguide sections 81 to the fundamental TE or TM mode of the wider waveguide sections 82 without excessive tapering loss. Each of the first and second arms 76 and 77 may comprise both narrower, e.g. single mode, waveguide sections 81, e.g. 400 nm to 1000 nm wide, and/or 200 nm to 1500 nm thick, and/or with a cross sectional area <3 $\mu m^2$, preferably less than 1 $\mu m^2$, and wider, e.g. multimode, waveguide sections 82, e.g. 1000 nm to 4000 nm wide, and/or 200 nm to 1000 nm thick, and/or with a cross sectional area of >preferably >0.3 $\mu m^2$ and <10 $\mu m^2$. Ideally, the narrower waveguide sections 81 may only support one TE mode and one TM mode, e.g. with optical propagation loss <0.6 dB/cm for the fundamental $TE_0$ and $TM_0$ modes, and with optical propagation loss >1 dB/cm for higher modes. The wider waveguide sections 82 may support more than one TE mode and more than one TM mode with optical propagation loss <0.6 dB/cm for all modes; however, ideally only the fundamental $TE_0$ and $TM_0$ modes are excited. The wider waveguide sections 82 may reduce optical propagation loss from scattering from waveguide surfaces, and absorption loss from waveguide surfaces and surrounding cladding materials, when compared to the narrower waveguide sections 81. The narrower waveguide sections 81 may filter out higher order mode resonances.

Each of the first and second arms 76 and 77 includes a plurality of modulator sections, e.g. two illustrated, comprising a plurality of the wider, e.g. multimode, waveguide sections 82 that are combined together, with narrower, e.g. single mode, bend sections, e.g. one or more curved sections with about a resulting 180° bend, comprising narrower waveguide sections 81 therebetween to avoid mode coupling in the bend.

The illustrated modulator 71 comprises an X- or Y-cut Lithium Niobate ($LiNbO_3$ or LN) design including a central signal electrode 85 for each modulator section with outer ground electrodes 86 and 87 adjacent the outer edges of each wider waveguide section 82. Ideally, the central signal electrode 85 and the outer ground electrodes 86 and 87 extend along and/or adjacent to, e.g. beside, at least a portion of wider waveguide sections 82 in the first and second arms 76 and 77. Preferably, the central signal electrode 75 and the outer ground electrodes 76 and 77 extend longer than the wider waveguide sections 82 and adjacent to narrower waveguide sections 81 in the first and second arms 76 and 77. However, a Z-cut LN design with one of the signal electrodes 85 and one of the ground electrodes 86 over top of each wider waveguide sections 82, or any other waveguide design, e.g. silicon, and electrode control for transmitting an electronic modulation signal to the first and second sub-beams of the input optical signal is within the scope of the invention. Preferably, the waveguides comprising the input waveguide or port 72, the first coupler 73, the first and second arms 76 and 77, the second coupler 78, and the output waveguide or port 79 comprising thin film lithium niobate or lithium tantalite, which may be fabricated in accordance with the methods disclosed in WO 2018/031916 filed Aug. 11, 2017 by Wang et al.

Ideally, the waveguide cores comprising the input waveguide or port 72, the first coupler 73, the first and second arms 76 and 77, the second coupler 78, and the output waveguide or port 79 of the modulator 71 are formed in the optical device layer 40 on the substrate 41, including a lower cladding layer 42 and a handle layer 43. In a preferred embodiment, the first and second arms 76 and 77 comprise of single crystal Lithium Niobate ($LiNbO_3$ or LN) or Lithium Tantalate (LT), as hereinbefore described, and the substrate 41 comprising a Lithium Niobate on insulator (LNOI) or Lithium Tantalate on insulator (LTOI) structure, including a silicon dioxide ($SiO_2$) cladding layer 42 on a silicon (Si) handle layer 43. Note that the handle layer 43 may be other materials, such as quartz, sapphire, fused silica. The lower cladding layer 43 may be any planarized material that has a lower refractive index than the waveguide material, including air (suspended structures). An upper cladding layer 44 with lower refractive index than the waveguide material, e.g. an upper $SiO_2$, may also be provided covering the modulator structure, i.e. first and second arms 76 and 77, and first and second couplers 73 and 78. However, other suitable waveguide materials exhibiting anisotropy in their dielectric properties, e.g. an electro-optic material with an electro-optic constant >10 pm/V, such as gallium arsenide (GaAs) and indium phosphide (InP) and barium titanate (BTO, $BaTiO_3$), are also within the scope of the invention.

Figure 5:
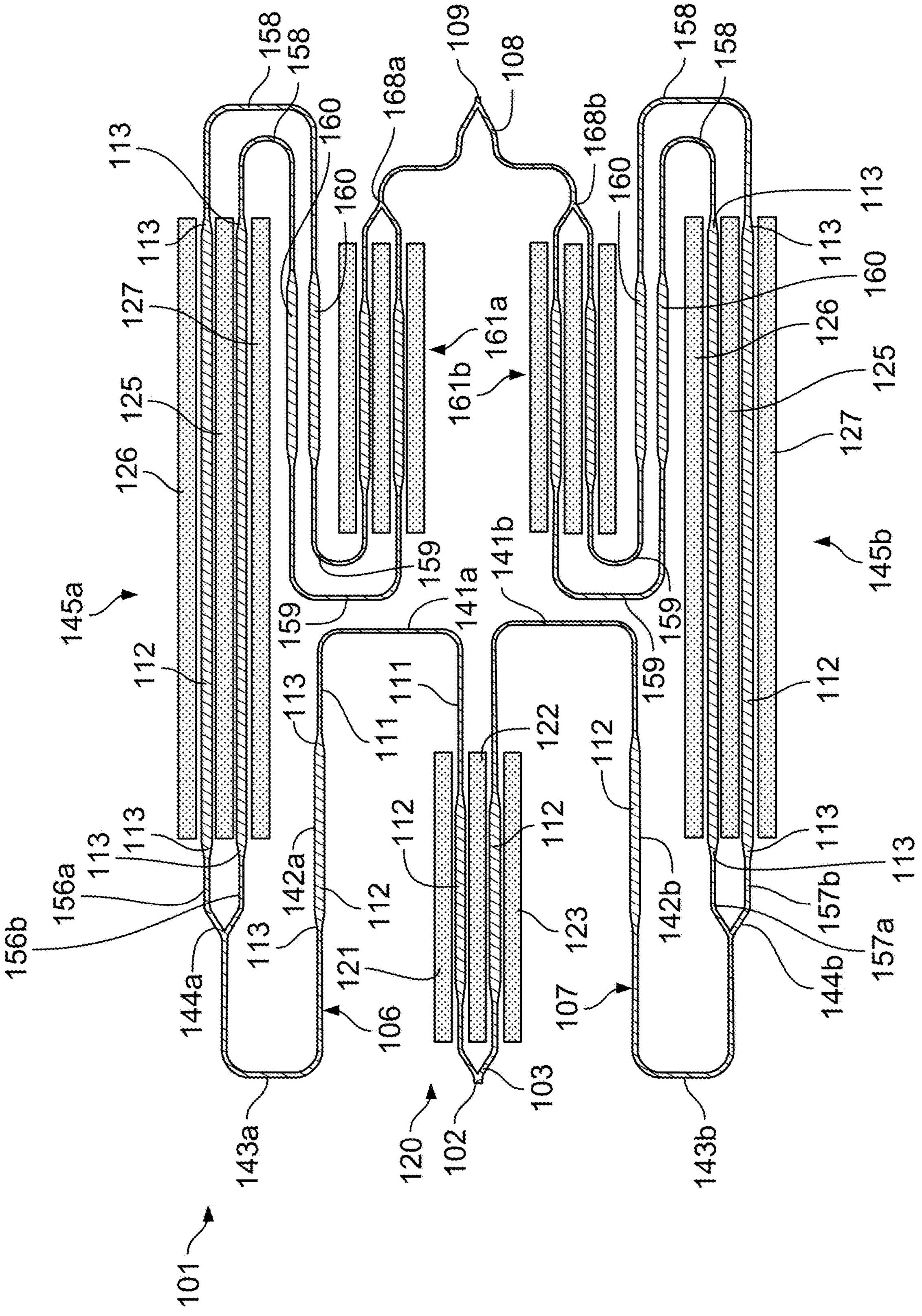
FIG. 5 is a schematic of an in-phase and quadrature (IQ) modulator, comprising multiple modulation sections.

With reference to FIG. 5, an in-phase and quadrature (IQ) optical modulator 101, may comprise multiple modulation sections. The light gray electrode sections (upper and lower) indicate high bandwidth transmission line, e.g. RF, electrodes, while the dark gray electrode sections (three middle sections) are used for low bandwidth, e.g. thermal, biasing of the device. Previous IQ modulator designs could not support sharp bending sections, and therefore require rather long electrode sections. The arms 106 and 107 of the interferometer may be completely balanced (same length) with this design.

The IQ modulator 101 includes: an input port or waveguide 102 optically coupled to a input coupler 103, e.g. a Y-splitter, for splitting an input optical signal into first and second beams (I and Q signals), which propagate along first and second arms 106 and 107, respectively; and an output coupler 108, e.g. a Y-splitter or 2×2 coupler, for recombining the first and second beams for output an output waveguide or port 109. Each of the first and second arms 106 and 107 comprise both narrower, e.g. single mode, waveguide sections 111 and wider, e.g. multimode, waveguide sections 112. The narrower waveguide sections 111 may include non-trivial guiding structures, such as splitters, e.g. the first and second couplers 103 and 108, and bends. The first and second arms 106 and 107 are folded back a plurality of times, whereby a plurality, if not all, of the wider waveguide sections 112 extend parallel to each other, to reduce the footprint of the IQ modulator 101. Each bend, e.g. one or more curved sections with about a resulting 180° bend, may comprise one of the narrower waveguide section 111, while each straight section may include or comprise one or more low-loss wider waveguide sections 112. Adiabatic tapers 113 are used to expand the narrower waveguide sections 111 into the wider waveguide sections 112, and to excite the fundamental mode of the low-loss wider waveguide sections 112. The adiabatic tapers 113 are also provided configured to taper the wider waveguide sections 112 down to the narrower waveguide sections 111. The wider waveguide sections 112 may be significantly longer than the narrower waveguide sections 111, e.g. commonly by a factor of 10 to 100, FIG. 5 is not to scale. The wider waveguide sections 112 may include only simple structures, e.g. a straight line and potentially shallow bends. The wider waveguide sections 112 and the narrower waveguide sections 111 are connected with the inverse tapers 113, which may be configured such that only the fundamental mode of the wider waveguide section 112 is excited. Particular examples of such taper 113 would include linear tapering of the waveguide width, cubic tapering of the waveguide width or exponential tapering, as well as other nonlinear tapering methods, as hereinbefore described with reference to tapers 13, 33, 63 and 83. The tapering may be configured to be gradual enough to enable modes to be adiabatically converted from the single mode in the narrower waveguide sections 111 to the fundamental TE or TM mode of the wider waveguide section 112 without excessive tapering loss. Each of the first and second arms 106 and 107 may comprise both narrower waveguide sections 111, e.g. 400 nm to 1000 nm wide, and/or 400 nm to 1500 nm thick, and/or with a cross sectional area <3 $\mu m^2$, preferably less than 1 $\mu m^2$, and wider waveguide sections 112, e.g. 1000 nm to 4000 nm wide and a cross sectional area of preferably >0.3 $\mu m^2$ and <10 $\mu m^2$. Ideally, the narrower waveguide sections 111 may only support one TE mode and one TM mode, e.g. with optical propagation loss <0.6 dB/cm for the fundamental $TE_0$ and $TM_0$ modes, and with optical propagation loss >1 dB/cm for higher TE and TM modes. The wider waveguide sections 112 support more than one TE mode and more than one TM mode with optical propagation loss <0.6 dB/cm for all modes; however, ideally only the fundamental modes are excited. The wider waveguide sections 112 reduce optical propagation loss from scattering from waveguide surfaces, and absorption loss from waveguide surfaces and surrounding cladding materials, when compared to single mode waveguide sections. The narrower waveguide sections 111 may filter out higher order mode resonances.

The first and second arms 106 and 107 may both pass through a first low-bandwidth biasing (phase) section 120 including a wider, e.g. multimode, waveguide section 112 from each of the first and second arms 106 and 107 adjacent to DC electrodes 121, 122 and 123 for adjusting the bias, e.g. phase, of the I and Q signals, e.g. quasi-statically thermal biasing. Each of the first and second arms 106 and 107 may include a first narrower, e.g. single-mode, bend section **141*a* and 141*b*, respectively, to direct the first and second arms 106 and 107 in opposite directions and then fold each of the first and second arms 106 and 107 back to wider, e.g. multimode, spacer sections 142*a* and 142*b*, which are passive wider waveguide sections, i.e. absent any electrodes, configured to reduce loss in long waveguide sections. Each of the first and second arms 106 and 107 may include a second narrower, e.g. single-mode, bend section 143*a* and 143*b*, respectively, for folding each of the first and second arms 106 and 107 back to an interim optical splitter 144*a* and 144*b* for splitting each of the first and second beams into respective first and second sub-beams for transmission along first and second interim arms 156*a*, 156*a*, 157*b* and 157*b* to respective optical modulator sections 145*a* and 145*b*. The first and second interim arms 156*a*, 156*a*, 157*b* and 157*b* are expanded via adiabatic tapers 113 to wider, e.g. multimode, waveguide sections 112 within the optical modulator sections 145*a* and 145*b*, and then reduced in size via adiabatic tapers 113 when exiting the optical modulator sections 145*a* and 145*b* to the narrower waveguide sections 111**.

Each of the first and second interim arms **156*a*, 156*a*, 157*b* and 157*b* may include a third and a fourth narrower, e.g. single-mode, bend sections 158 and 159 with a wider, e.g. multimode, spacer section 160 therebetween for winding the first and second interim arms 156*a*, 156*a*, 157*b* and 157*b*, i.e. the first and second arms 106 and 107, to a respective final biasing (phase) section 161*a* and 161*b*, similar to the biasing section 120. For example, one or both of the final phase biasing sections 161*a* and 161*b* may be configured to implement a relative phase bias between the first and second modulated beams (I and Q signals), e.g. π/2 phase difference. Each of the first and second arms 106 and 107 includes an interim combiner coupler 168*a* and 168*b* for combining the respective first and second sub-beams back into first and second modulated beams (I and Q signals) for recombination in the output coupler 108 and output the output waveguide or port 109**.

The illustrated modulator sections **145*a* and 145*b* may comprise an X- or Y-cut Lithium Niobate ($LiNbO_3$ or LN) design including a high-bandwidth transmission line central RF-signal electrode 125 with outer ground electrodes 126 and 127 adjacent the outer edges of each wider waveguide section 112. Ideally, the central signal electrode 125, the outer ground electrodes 126 and 127, and the DC electrodes 121-123 extend along and/or adjacent to, e.g. beside, at least a portion of the wider waveguide sections 112 in the first and second interim arms 156*a*, 156*b*, 157*a* and 157*b*. Preferably, the central signal electrode 175 and the outer ground electrodes 176 and 177 extend longer than the wider waveguide sections 112 and adjacent to narrower waveguide sections 111 in the first and second interim arms 156*a*, 156*b*, 157*a* and 157*b*. However, a Z-cut LN design with one of the signal electrodes 125 and one of the ground electrodes 126 over top of each wider waveguide sections 112, or any other waveguide design, e.g. GaAs, InP, and electrode control for transmitting an electronic modulation signal to the optical signals is within the scope of the invention. Preferably, the waveguides comprising the input port or waveguide 102, the first coupler 103, the first and second arms 106 and 107, the second coupler 108, and the output waveguide or port 109** may comprise thin film lithium niobate or lithium tantalite, which may be fabricated in accordance with the methods disclosed in WO 2018/031916 filed Aug. 11, 2017 by Wang et al.

Ideally, the waveguide cores comprising the input port or waveguide 102, the first coupler 103, the first and second arms 106 and 107, the second coupler 108, and the output waveguide or port 109 of the IQ modulator 101 is formed in the optical device layer 40 on the substrate 41, including a lower cladding layer 42 and a handle layer 43. In a preferred embodiment, the first and second arms 106 and 107 may comprise single crystal Lithium Niobate ($LiNbO_3$ or LN) or Lithium Tantalate (LT), and the substrate 41 may comprise a Lithium Niobate on insulator (LNOI) or Lithium Tantalate on insulator (LTOI) structure, including a silicon dioxide ($SiO_2$) lower cladding layer 42 on a silicon (Si) handle layer 43. Note that the handle layer 43 may be other materials such as quartz, sapphire, fused silica. The lower cladding layer 42 may be any planarized material that has a lower refractive index than the waveguide material, including air (suspended structures). An upper cladding layer 44, e.g. an upper $SiO_2$, with lower refractive index than the waveguide material, may also be provided covering the modulator structure, i.e. first and second arms 106 and 107, and first and second couplers 103 and 108. However, other suitable waveguide materials exhibiting anisotropy in their dielectric properties, e.g. an electro-optic material with an electro-optic constant >10 pm/V, such as gallium arsenide (GaAs) and indium phosphide (InP), are also within the scope of the invention.

Figure 6A:
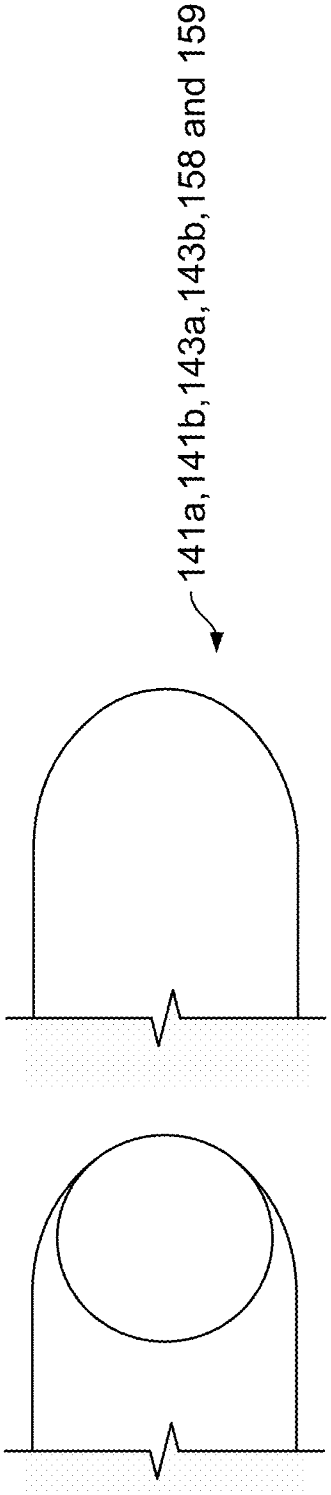
FIGS. 6A and 6B illustrate the curvatures of the bend sections compared to conventional bend sections.
Figure 6B:
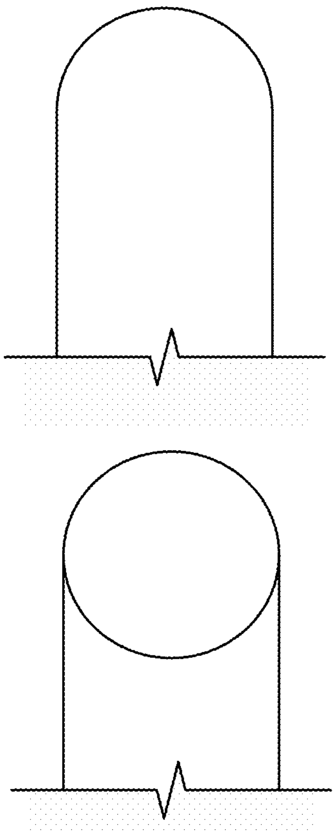

With reference to FIGS. 6A and 6B, in addition to employing different waveguide widths, i.e. single mode and multimode, the bends or bend sections, e.g. 141*a*, 141*b*, 143*a*, 143*b*, 158 and 159, may be designed to have a gradual increase or decrease of curvature in 90° and 180° bends (top right) to further reduce unnecessary optical loss in these hybrid mode structures. In particular, the gradual increase in curvature may follow a Euler curve (FIG. 6A) or any other transition curve with changing bend curvature, where the curvature increases linearly from 0 to a certain value, then connecting an arc of a circle with the same curvature then connecting to another tapered curvature region to go back to a straight line. FIGS. 6A and 6B illustrate the difference between a circular bend (6B) and an ultralow loss bend (6A). The pictures on the left shows the bend with a circle to show the gradual increase of curvature.

Although described in the context of IQ modulator 101, ring resonator 21, modulators 1 and 71, and optical delay line structure 51, other optical devices and/or devices having different configurations may utilize sections supporting different modes (and/or different numbers of modes) and tapers. For example, a folded modulator analogous to modulator(s) 1 and/or 71, optical devices using other types of modulation in addition to or in lieu of electrodes, and/or other optical devices may be analogous to devices 1, 21, 71, 101, and/or other analogous device(s). For example, FIGS. 7, 8, 9, and 10 depict embodiments of optical devices that may be formed using analogous technology as described in the context of devices 1, 21, 71, and 101. Although various embodiments are depicted in FIGS. 1-10 and various features highlighted, these features and other features may be combined in manners not explicitly depicted herein.

Figure 7:
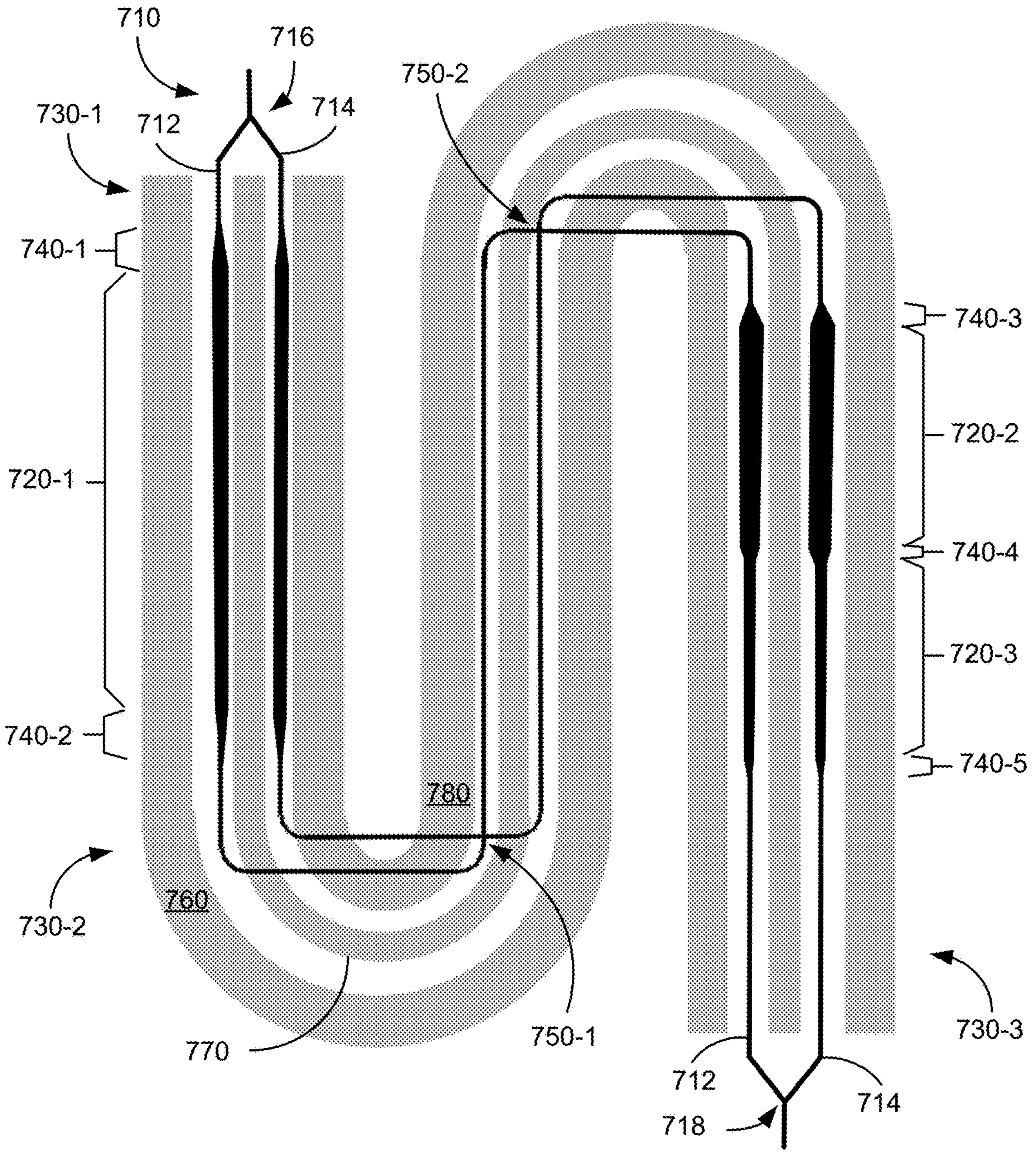
FIG. 7 depicts an embodiment of a folded optical modulator including regions supporting different modes.

FIG. 7 depicts a top or plan view of an embodiment of folded optical modulator 700 including regions supporting different modes. For clarity, FIG. 7 is not to scale and not all components may be shown. For example, top cladding and/or substrate material(s) may not be shown. Optical device 700 includes a lithium-containing electro-optic layer that has been formed into waveguide 710, and a modulation driver. Optical device 700 may also include a substrate and/or underlayers (not shown). Such a substrate may include an underlying substrate such as Si and a buried oxide (BOX) layer (not separately shown) that may be at least three micrometers thick (e.g. at least three micrometers and not more than ten micrometers). Such a BOX layer may be formed of silicon dioxide.

The modulation driver of optical modulator 700 operates to modulate (e.g. encode information into) the optical signal carried by waveguide 710. The modulation driver of optical modulator 700 includes electrodes 760, 770, and 780. In some embodiments, the modulation driver might include heater(s), a stress inducer and/or other mechanisms in addition to or in lieu of electrodes 760, 770, and/or 780. Optical modulator 700 may be or include a thermo-optic optical phase shifters or electro-optic optical phase shifters. Electrodes 760, 770, and/or 780 may also be configured differently. For example, electrode 760, 770, and/or 780 may include extensions. In some embodiments, electrode 770 is a ground electrode, while electrodes 760 and 780 are signal electrodes. In some embodiments, electrodes 760, 770, and 780 may be differential electrodes (e.g. +signal, −signal, and +signal). In other embodiments, electrodes 760, 770, and 780 may be configured differently. Further, some portions of electrodes 760, 770, and/or 780 may be at different heights in optical modulator 700. Thus, portions of electrodes 760, 770, and/or 780 may be sufficiently far from waveguide 710 that modulation does not occur in these regions. For example, bends in electrodes 760, 770, and/or 780 may be further from (higher or buried deeper) than waveguide 710. Modulation may thus not occur near such bends.

Waveguide 710 may include lithium containing thin film electro-optic (TFEO) materials. For example, waveguide 710 may include or consist of LN (e.g. thin film LN, or TFLN) and/or LT (e.g. thin film LT, or TFLT). In some embodiments, other electro-optic materials may be used. Waveguide 710 may be a ridge waveguide. Thus, the portions of waveguide 710 shown may be the ridge portion, while a slab portion may be adjacent to the ridge. The presence of a slab may aid in directing electric field used to modulate the optical signal in waveguide 710.

In some embodiments, the nonlinear optical material for waveguide 710 is formed as a thin film. For example, the thin film may have a thickness (e.g. of thin film or slab portion and ridge waveguide portion) of not more than three multiplied by the optical wavelengths for the optical signal carried in waveguide 710 before processing. In some embodiments, the thin film has a thickness (e.g. of the slab/thin film portion and ridge waveguide portion 710) of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. In some embodiment, the thin film has a total thickness of not more than one micrometer. In some embodiments, the thin film has a total thickness of not more than seven hundred nanometers. In some such embodiments, the thin film has a total thickness of not more than four hundred nanometers. In some embodiments, the thin film has a thickness of at least one hundred nanometers.

The thin film nonlinear optical material may be fabricated into waveguide 710 utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Waveguide 710 may thus have improved surface roughness. For example, the sidewall(s) of ridge waveguide 710 may have reduced surface roughness. For example, the short range root mean square surface roughness of a sidewall of the waveguide 710 is less than ten nanometers. In some embodiments, this root mean square surface roughness is not more than five nanometers. In some cases, the short range root mean square surface roughness does not exceed two nanometers. Thus, waveguide 710 may have the optical losses in the ranges described herein. For example, optical device 700 may have an optical loss of not more than 1 dB/cm through the modulation device. In some such embodiments, waveguide 710 has an optical loss of not more than 0.5 dB/cm (e.g. on average) in some cases. In some embodiments, the waveguide has a total optical loss on-chip of not more than 4 dB. In some embodiments, the portion of the waveguide proximate to the modulation device has a total optical loss of not more than 3 dB. Optical efficiency of the device may be improved.

In some embodiments, the height of waveguide 700 may be selected to provide a confinement of the optical mode such that there is a 10 dB reduction in intensity from the intensity at the center of ridge waveguide 710 at ten micrometers from the center of ridge waveguide 710. For example, the height of ridge waveguide 710 is on the order of a few hundred nanometers in some cases. However, other heights are possible in other embodiments. A portion of waveguide 710 is proximate to electrodes 760, 770, and 180 along the direction of transmission of the optical signal (e.g. from the input of the optical signal through waveguide 710 to the modulated optical signal output). The portion of waveguide 710 proximate to electrodes 760, 770, and/or 780 may the lengths described above, for example a length greater than two millimeters in some embodiments, and greater than two or more centimeters in some such embodiments. Such lengths are possible at least in part because of the low optical losses per unit length for waveguide 710 described above. Further, the portion of waveguide 710 proximate to electrodes 760, 770, and 780 has an optical mode cross-sectional area that is small, as described above.

Waveguide 710 includes arms 712 and 714, splitters 716 and 718, and crossings 750-1 and 750-2 (collectively or generically 750). Splitters 716 and 718 split or combine the optical signal to/from arms 712 and 714. Waveguide 710 also includes regions 720-1, 720-2, and 720-3 (collectively or generically 720) as well as regions 730-1, 730-2, and 730-3 (collectively or generically 720). In the embodiment shown, each arm 712 and 714 includes analogous regions 720 and 730. In other embodiments, arms 712 and 714 may include different regions 720 and/or 730.

Regions 720 and 730 may support different sets of modes of the optical signal in waveguide 710. A set of modes may include one or more modes. For example one set of modes could include the fundamental TE mode only. Another set of modes might include the fundamental TE and TM modes. Another set might include one or more other and/or additional modes. For example, regions 730 may each support a single mode, while regions 720 may support multiple modes. In some such embodiments, regions 730 only support one TE mode and/or one TM mode. For example, such regions 730 may support the fundamental TE and TEM modes, e.g. with optical propagation loss <0.6 dB/cm for fundamental $TE_o$ and $TM_o$ modes, and e.g. with optical propagation loss >1 dB/cm for higher order TE and/or TM modes. In some embodiments, regions 720 support more than one TE mode and more than one TM mode with optical propagation loss <0.6 dB/cm for all supported modes. However, only the fundamental TM and/or TE modes are excited in some region(s) 720 and/or 730. Thus, regions 720 may be analogous to wider waveguide sections 32, while regions 730 may be analogous to narrower waveguide sections 31. In other embodiments, one or more of regions 730 may support multiple modes. However, regions 720 may support a different set of modes than regions 730. In other embodiments, regions 720 and/or 730 may change the mode geometry but not change the mode(s) supported by waveguide 710.

In some embodiments, each region 720 and/or 730 has an appropriate width and/or cross-sectional area for the desired set of modes to be supported. For example, regions 720-1 and 720-3 may support the same set of modes (e.g. may have the same width), while region 720-2 may support a different set of modes (e.g. may have a different width). In other embodiments, regions 720-1, 720-2, and 720-3 may support the same number of modes (e.g. have the same width). In other embodiments, regions 720-1, 720-2, and 720-3 may each support a different number of modes (e.g. each has a different width). Wider waveguide regions (e.g. regions 720 versus regions 730) may reduce optical propagation loss from scattering from waveguide surfaces, and absorption loss from waveguide surfaces and surrounding cladding materials. In contrast, region 730-2 that includes bends may be desired to support fewer modes (e.g. a single mode). Fewer (e.g. single) modes in regions 730-2 may reduce optical losses through bends in waveguide 710. In some embodiments, the regions 720 have cross sectional area(s) greater than 0.1 $\mu m^2$ and less than 10 $\mu m^2$. In some embodiments, the regions 720 have cross sectional area(s) greater than 0.2 $\mu m^2$ and less than 7 $\mu m^2$. In some embodiments, region(s) 730 have cross sectional area(s) of less than 3 $\mu m^2$. In some embodiments, there is a single spatial mode per polarization in the bended portion of the electrodes, whereas multiple spatial modes are supported in in the wider parts of the electrodes.

Waveguide 710 also includes tapers 740-1, 740-2, 740-3, 740-4, and 740-5 (collectively or generically 740). Tapers 740 transition between regions 720 and 730. Tapers 740 may be analogous to tapers 33. For example, tapers 740 may be low loss tapers. For example, a taper 740 may have an optical loss not exceeding 0.2 dB. In some embodiments, the optical loss for through a taper 740 does not exceed 0.1 dB. Tapers 740 may be linear, exponential, or other tapers. In some embodiments, some or all of tapers 740 may be adiabatic tapers.

Waveguide arms 712 and 714 also intersect at crossings 750. Crossings 750 allow the optical signals carried in waveguide arms 712 and 714 to undergo the desired modulation by electrodes 760, 770, and 780. As previously discussed, waveguide 710 may be low loss and have a low sidewall surface roughness. Further, crossings 750 may be low loss crossings. In some embodiments, for example, each crossing 750 has a loss and cross-talk as described herein. For example, the loss may be not more than 0.1 dB and a cross-talk of light scattered into the crossing arm not exceeding negative 30 dB (i.e. between zero and negative fifty dB).

Performance of optical modulator 700 may be improved. Optical modulator 700 is a folded optical modulator. Thus, electrodes 760, 770, and 780 may drive modulation of the optical signal carried in waveguide arms 712 and 714 over a higher length while remaining in a smaller cross-sectional area. The use of regions 720 and 730 configured to carry different sets of modes may reduce losses and improve performance. Tapers 740 and crossings 750 may also be lower in losses. Use of LN and/or LT in waveguide 710 may also increase the modulation provided by electrodes 760 770, and 780. Thus, performance of optical modulator 700 may be improved.

Figure 8:
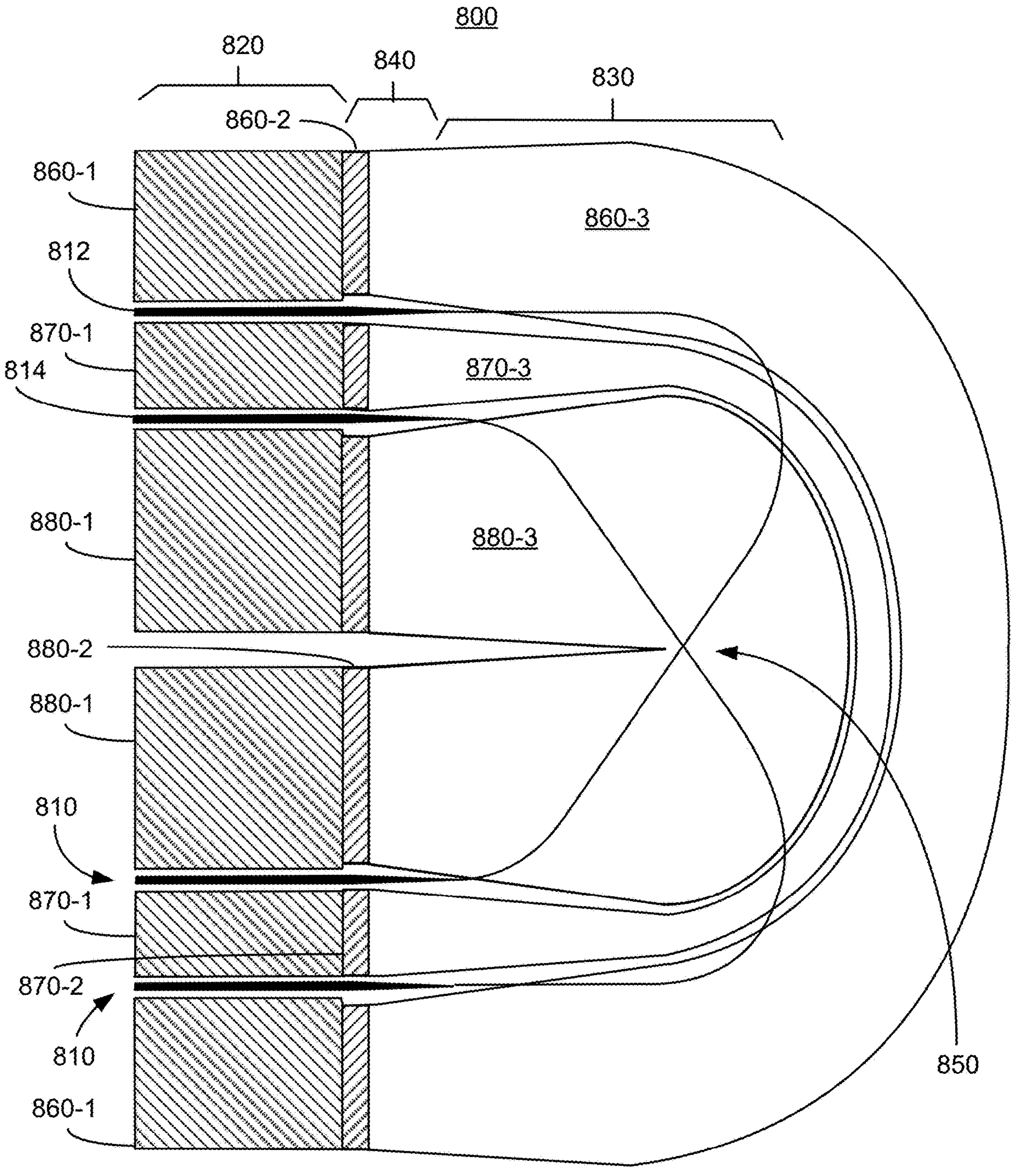
FIG. 8 depicts a portion of an embodiment of an optical device including waveguide crossings and tapered electrodes and waveguides.

FIG. 8 depicts a portion of an embodiment of optical device 800 including waveguide crossings and tapered electrodes and waveguides. Optical device 800 is analogous to optical device 700. Thus, optical device 800 includes waveguide 810 including arms 812 and 814 and electrodes 860 (including portions 860-1, 860-2, and 860-3), 870 (including portions 870-1, 870-2, and 870-3), and 880 (including portions 880-1, 880-2, and 880-3). Waveguide 810 is analogous to waveguide 710. Electrodes 860, 870, and 880 are part of a modulation driver and analogous to electrodes 760, 770, and 780, respectively. Waveguide 810 (and waveguide arms 812 and 814) includes regions 820 and 830 and tapers 840 that are analogous to regions 720 and 730 and tapers 740. Waveguide arms 812 and 814 meet at crossing 850 that is analogous to crossing 750. Thus, optical device 800 may share the benefits of optical device 700.

Electrode sections 860-1, 870-1, and 880-1 are a first distance from waveguide 810. Electrode sections 860-2, 870-2, and 880-2 are a second distance from waveguide 810. Electrode sections 860-3, 870-3, and 880-3 are a third distance from waveguide 810. For example, electrode sections 860-1, 870-1, and 880-1 may be closest to waveguide 810. Thus, modulation may occur for electrode sections 860-1, 870-1, and 880-1 and electrode sections 820. Electrode sections 860-2, 870-2, and 880-2 may be a second, greater distance from waveguide 810. For example, electrode sections 860-2, 870-2, and 880-2 may transition to a lower (or greater) distance from the underlying substrate (not shown in FIG. 8). Electrode sections 860-3, 870-3, and 880-3 may be furthest from waveguide 810. Thus, electrodes 860, 870 and 880 may not provide modulation of the optical signal in the area where waveguide arms 812 and 814 and electrodes 860, 870, and 880 bend.

In addition, electrodes 860, 870, and 880 include tapers. Thus, the widths of electrodes 860, 870, and 880 vary. More specifically, electrode portions 860-3, 870-3, and 880-3 are tapered. Thus, the gap between electrodes 860, 870, and 880 and waveguide arms 812 and 814 varies. In some embodiments, the RF return loss of optical device 800 may be engineered using the tapers of electrodes 860, 870, and 880. For example, the RF characteristic impedance of optical device 800 may be kept constant through the bend shown. In some embodiments, the center electrode width of electrode portion 870 and electrode gap spacing between electrode portion 870 and electrode section 880-3 or 860-3 are tapered in order to maintain the same impedance. In some embodiments, tapers of electrodes 860, 870, and 880 and/or tapered region 840 of waveguide 810 may be engineered for other purposes.

Optical device 800 may, therefore, share some or all of the benefits of optical modulator 700. In addition, tapering of electrodes 860, 870, and/or 880 may control the RF impedance, RF return loss, or excitation of parasitic RF modes and/or other properties of optical device 800. Thus, performance of optical device 800 may be further improved. For example, tapering the metal of the electrodes 860, 870, and 880 such that the gap between electrode section 860-3 and 870-3 and between electrode sections 880-3 and 870-3 is less than for example a tenth of the RF wavelength of the coplanar waveguide mode can improve performance of the optical device by reducing the excitation of parasitic RF modes such as the slotline mode. By reducing excitation of parasitic modes, the loss through the RF coplanar waveguide including electrodes 860, 870, and 880 is reduced and the chirp factor of the electro-optic modulator 800 is reduced. The shallowness of the angle of the tapering of an electrode may result in lower RF loss of optical device 800 by reducing discontinuity parasitics. In some embodiments, a long taper, for example more than three times as long as the signal line width of electrode section 870 is desired to reduce loss.

Figure 9:
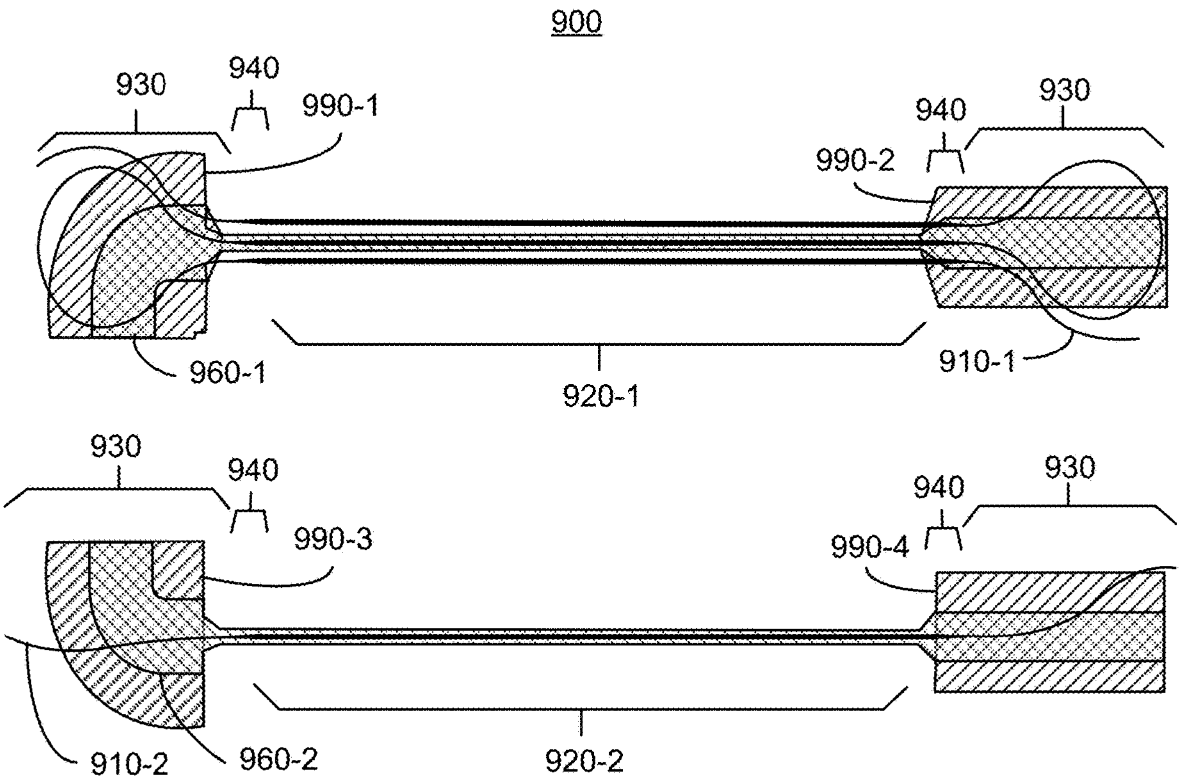
FIG. 9 depicts an embodiment of a portion of an optical modulator.

FIG. 9 depicts an embodiment of a portion of optical device 900. Optical device 900 is analogous to optical device(s) 700 and/or 800. Thus, optical device 900 includes waveguide portions 910-1 and 910-2 (collectively or generically 910) and a modulator driver. The modulator driver includes heaters 960 (including portions 960-1, 960-2, 960-3, and 960-4) and 990 (including portions 990-1 and 990-2). Waveguide 910 is analogous to waveguide(s) 710 and/or 810. Heaters 960 and 990 are analogous to electrodes 760, 770, 780, 860, 870, and 880. Thus, heaters 960 and 990 may be used to modulate the optical signal carried by waveguides 910. Waveguide 910 includes regions 920-1 and 920-2 (collectively or generically 920), regions 930 and tapers 940 that are analogous to regions 720/820 and 730/830 and tapers 740/840.

Thus, optical device 900 may share the benefits of optical device(s) 700 and/or 800. In addition, the modulation driver may include not only electrodes but also heaters 960 and 990. Thus, in addition to or in lieu of electro-optic modulation, other types of modulation may be used with optical device 900. A heater may be used for slower modulation whereas an electrode may be used for fast modulation. In some embodiments the slow thermo-optic modulation by the heaters is below 50 kHz. For example, heater(s) 960 may be for modulation below 20 kHz, below 10 kHz, and/or below 5 kHz. In some embodiments, heaters can be used down to DC. In some embodiments the fast modulation in the electro-optic modulation ranges from kHz to GHz modulation speeds.

Figure 10:
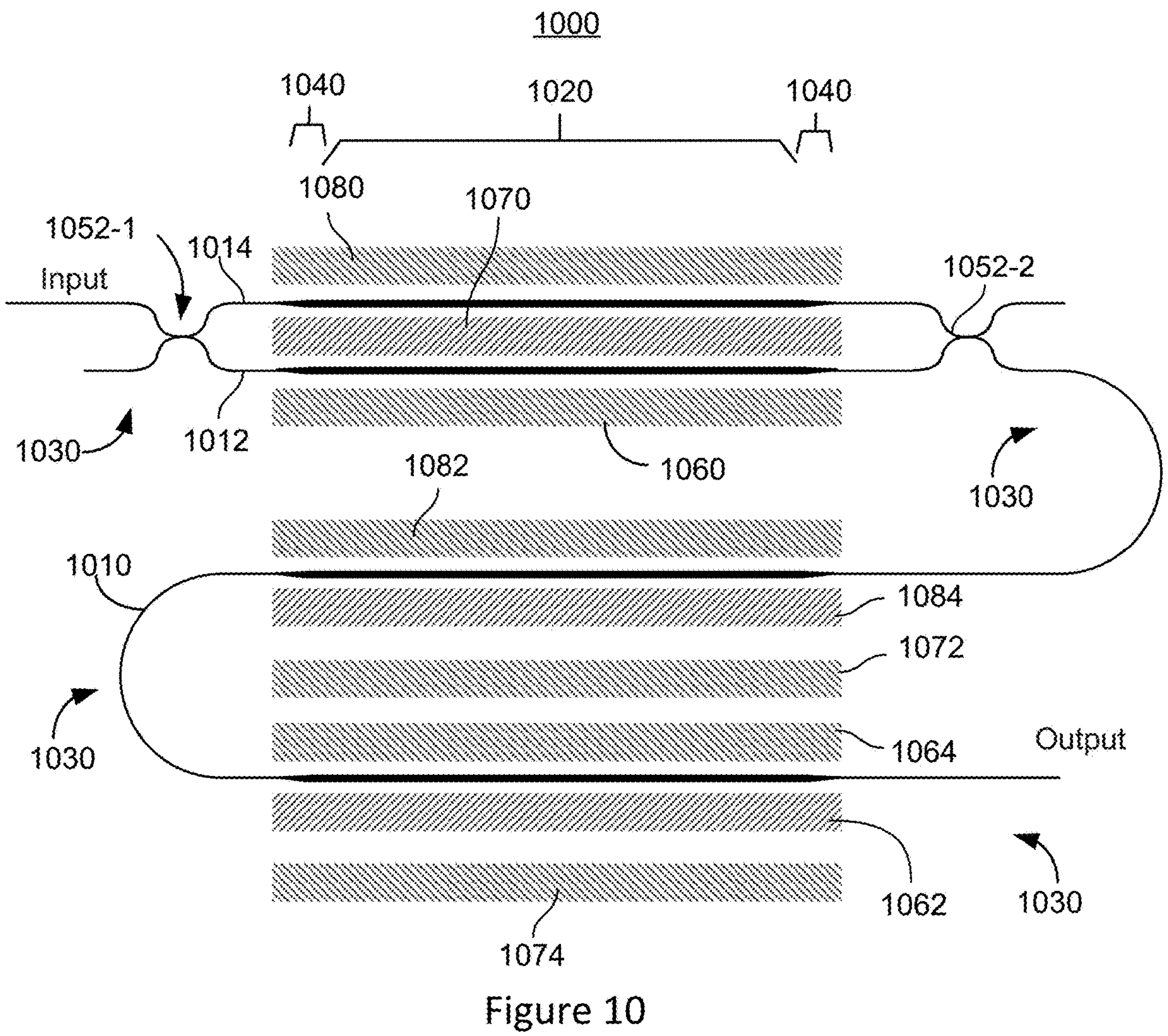
FIG. 10 depicts an embodiment of a frequency comb including multiple regions supporting different sets of modes.

FIG. 10 depicts an embodiment of frequency comb 1000 including multiple regions supporting different sets of modes.

Frequency comb 1000 is analogous to optical device(s) 700, 800, and/or 900. Thus, frequency comb 1000 includes waveguide 1010 including arms 1012 and 1014 and a modulator driver. The modulator driver includes electrodes 1060, 1070, and 1080, 1062, 1064, 1072, 1082 and 1084 that are analogous to electrodes 760, 770, 780, 860, 870, and 880. Thus, electrodes 1060, 1070, and 1080, 1062, 1064, 1072, 1082 and 1084 may be used to modulate the optical signal carried by waveguide 1010. Waveguide 1010 includes regions 1020, regions 1030 and tapers 1040 that are analogous to regions 720/820 and 730/830 and tapers 740/840. Waveguide 1010 also includes splitters 1052-1 and 1052-2 (collectively or generically 1052).

Frequency comb 1000 employs intensity modulation using waveguide arms 1012 and 1014 as well as phase modulation using electrodes 1082, 1084, 1072, 1064, 1062, and 1074. Although two phase modulation sections and one intensity modulation section are shown, a different number of one or both may be present in some embodiments. For example, additional phase modulation sections may be present. Waveguide 1010 has regions 1020 in regions in which the optical signal is modulated and regions 1030 where waveguide 1010 bends. In some embodiments, regions 1020 support multiple modes, while regions 1030 support a single mode. However, other configurations of sets of modes supported by regions 1020 and 1030 are possible.

Frequency comb 1000 shares the benefits of optical devices 700, 800, and/or 900. In particular, frequency comb 1000 may be lower in loss while providing the desired modulation and output signals.

Figure 11:
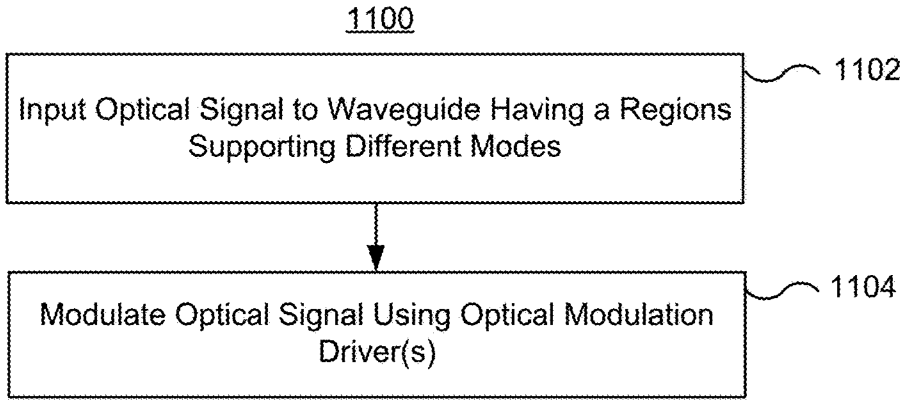
FIG. 11 is a flow chart depicting a method for modulating an optical signal.

FIG. 11 is a flow chart depicting method 1100 for modulating an optical signal. Although described in the context of particular steps, method 1100 may include another number of steps. Method 1100 may also include substeps (not explicitly shown).

An optical signal is input to a waveguide, at 1102. The waveguide may include regions supporting different numbers and/or types of modes. The waveguide may also contain lithium and be fabricated such that the surface roughness and attended optical losses are low. At 1104, the optical signal is modulated using one or more modulation drivers. For example, electric signals (e.g. electro-optic modulation), heaters, stress, and/or other techniques may be used to modulate the optical signal at 1104.

For example, a signal may be input waveguide 710 of optical device 700. The optical signal is modulated using electrodes 760, 770, and 780. Thus, the modulated optical signal may be output. Similarly, an optical signal may be input to waveguide 1010. As the optical signal traverses waveguide 1010, intensity and phase modulation may be applied. Thus, the desired output signal may be provided by frequency comb 1000.

Using method 1100, the desired modulation may be provided to optical signals. Further, the benefits of region supporting different sets of modes may be realized. For example, lower losses and improved performance may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An optical device comprising:

a waveguide including a first region supporting a first set of modes of an optical signal, a second region supporting a second set of modes of the optical signal, and a tapered region between the first region and the second region, the first set of modes being different from the second set of modes, the waveguide including lithium and including a waveguide bend;

a modulation driver configured to provide modulation of the optical signal in the first region, the modulation driver including a plurality of electrodes, at least the first region of the waveguide being between the plurality of electrodes, the plurality of electrodes including a central electrode having a first electrode portion and a second electrode portion separated from the first electrode portion by a gap, the gap having a wedge-shape termination proximate to the waveguide bend.

2. The optical device of claim 1, wherein the modulation driver includes a heater proximate to the first region of the waveguide.

3. The optical device of claim 1, wherein the first region and at least a portion of the tapered region being are between the plurality of electrodes.

4. The optical device of claim 1, wherein the plurality of electrodes include an electrode tapered region, at least one of the second region and the tapered region being proximate to the electrode tapered region such that a distance between the waveguide and the plurality of electrodes varies.

5. The optical device of claim 1, wherein the waveguide includes a first waveguide arm and a second waveguide arm, each of the first waveguide arm and the second waveguide arm included in the first region, the tapered region, and the second region, each of the first waveguide arm and the second waveguide arm supporting the first set of modes in the first region, each of the first waveguide arm and the second waveguide arm supporting the second set of modes in the second region, the first waveguide arm and the second waveguide arm crossing in the second region.

6. The optical device of claim 5, wherein the crossing of the first waveguide arm and the second waveguide arm has a loss not exceeding negative 0.1 dB and a cross-talk of light scattered into the crossing not exceeding negative 30 dB.

7. The optical device of claim 6, wherein the first waveguide arm and the second waveguide arm include a bend in the second region.

8. The optical device of claim 1, wherein the waveguide includes a first waveguide arm and a second waveguide arm, each of the first waveguide arm and the second waveguide arm included in the first region and the tapered region, each of the first waveguide arm and the second waveguide arm supporting the first set of modes in the first region, the waveguide further including a splitter in the second region configured to combine the optical signal for first waveguide arm and the second waveguide arm into a single arm.

9. The optical device of claim 8, wherein the waveguide includes a third region and a fourth region, the first waveguide arm supporting a third set of modes in the third region and a fourth set of modes in the fourth region, the third set of modes and the fourth set of modes being different from the second set of modes, the optical signal being modulated in at least one of the third region or the fourth region.

10. The optical device of claim 9, wherein the optical device is configured as a frequency comb.

11. The optical device of claim 1, wherein the tapered region is a low loss tapered region.

12. The optical device of claim 1, wherein the first region has a cross sectional area greater than 0.1 $\mu m^2$ and less than 10 $\mu m^2$.

13. The optical device of claim 12, wherein the first region has the cross sectional area of less than 3 $\mu m^2$.

14. An optical device comprising:

a waveguide including a plurality of regions, the plurality of regions supporting a plurality of sets of modes of an optical signal, a first portion of the plurality of sets of modes being different from a second portion of the plurality of sets of modes, a plurality of tapered regions being between the plurality of regions, the waveguide including lithium and having at least one waveguide bend;

at least one modulation driver configured to provide modulation of the optical signal in at least a portion of the plurality of regions, the modulation driver including a plurality of electrodes, at least a first region of the plurality of regions of the waveguide being between the plurality of electrodes, the plurality of electrodes including a central electrode having a first electrode portion and a second electrode portion separated from the first electrode portion by a gap, the gap having a wedge-shape termination proximate to the at least one waveguide bend;

wherein the optical device includes at least one of a heater as part of the at least one modulation driver, a first waveguide arm and a second waveguide arm as part of the waveguide, or a configuration of the plurality of regions and the plurality of tapered regions as a frequency comb;

wherein the first waveguide arm and the second waveguide arm are included in at least a portion of the plurality of regions and at least a portion of the plurality of tapered regions, the first waveguide arm and the second waveguide arm crossing, the crossing having a loss not exceeding 0.1 dB and a cross-talk not exceeding negative 30 dB.

15. A method comprising:

inputting an optical signal to a waveguide including a first region supporting a first set of modes of an optical signal and a waveguide bend, a second region supporting a second set of modes of the optical signal, and a tapered region between the first region and the second region, the first set of modes being different from the second set of modes, the waveguide including lithium;

modulating the optical signal using an optical modulation driver configured to provide modulation of the optical signal in the first region, the optical modulation driver being proximate to the first region, the modulation driver including a plurality of electrodes, at least the first region of the waveguide being between the plurality of electrodes, the plurality of electrodes including a central electrode having a first electrode portion and a second electrode portion separated from the first electrode portion by a gap, the gap having a wedge-shape termination proximate to the waveguide bend.

16. The method of claim 15, wherein the modulating further includes:

at least one of heating the first region or exposing the first region to an electric field.

17. The method of claim 15, wherein the first region and at least a portion of the tapered region being between the plurality of electrodes.

18. The method of claim 15, wherein the plurality of electrodes include an electrode tapered region, at least one of the second region and the tapered region being proximate to the electrode tapered region such that a distance between the waveguide and the plurality of electrodes varies.

19. The method of claim 15, wherein the waveguide includes a first waveguide arm and a second waveguide arm, each of the first waveguide arm and the second waveguide arm included in the first region, the tapered region, and the second region, each of the first waveguide arm and the second waveguide arm supporting the first set of modes in the first region, each of the first waveguide arm and the second waveguide arm supporting the second set of modes in the second region, the first waveguide arm and the second waveguide arm crossing in the second region, and wherein the crossing of the first waveguide arm and the second waveguide arm has a loss not exceeding 0.1 dB and a cross-talk of light scattered into the crossing not exceeding negative 30 dB.

20. The method of claim 15, wherein the waveguide includes a first waveguide arm and a second waveguide arm, each of the first waveguide arm and the second waveguide arm included in the first region and the tapered region, each of the first waveguide arm and the second waveguide arm supporting the first set of modes in the first region, the waveguide further including a splitter in the second region configured to combine the optical signal for first waveguide arm and the second waveguide arm into a single arm;

wherein the waveguide includes a third region and a fourth region, the single first waveguide arm supporting a third set of modes in the third region and a fourth set of modes in the fourth region, the third set of modes and the fourth set of modes being different from the second set of modes, the optical signal being modulated in the third region and the fourth region wherein the waveguide and modulation driver are configured as a frequency comb.

* * * * *